(12) United States Patent (10) Patent No.: US 11,680,408 B2
Kim (45) Date of Patent: Jun. 20, 2023

(54) GRID FIXING APPARATUS HAVING SPACER-INTEGRATED RETAINING CLIP FOR GRID REINFORCEMENT AND GRID FIXING METHOD USING THE SAME

(71) Applicant: KOREA INSTITUTE OF CIVIL ENGINEERING AND BUILDING TECHNOLOGY, Gyeonggi-Do (KR)

(72) Inventor: Hyeong Yeol Kim, Gyeonggi-do (KR)

(73) Assignee: KOREA INSTITUTE OF CIVIL ENGINEERING AND BUILDING TECHNOLOGY, Gyeonggi-Do (KR)

(*) Notice: Subject to any disclaimer, the term of this patent is extended or adjusted under 35 U.S.C. 154(b) by 134 days.

(21) Appl. No.: 17/329,089

(22) Filed: May 24, 2021

(65) Prior Publication Data

US 2022/0136248 A1 May 5, 2022

(30) Foreign Application Priority Data

Nov. 3, 2020 (KR) .......................... 10-2020-0145489

(51) Int. Cl.
*E04C 5/16* (2006.01)
*E04G 23/02* (2006.01)
*F16M 13/02* (2006.01)

(52) U.S. Cl.
CPC .......... *E04C 5/168* (2013.01); *E04G 23/0218* (2013.01); *F16M 13/02* (2013.01)

(58) Field of Classification Search
CPC . E04C 5/20; E04C 5/201; E04C 5/203; E04C 5/205; E04C 5/206; E04C 5/208; E04C 5/04; E04C 5/07; E04C 5/073; E04C 5/168; E04G 17/0658; E04G 17/06; E04G 2023/0262; E04G 2023/0251; E04G 23/0218; F16M 13/02
See application file for complete search history.

(56) References Cited

U.S. PATENT DOCUMENTS 8,479,468 B1 * 7/2013 Abbasi ................ E04G 23/0218
52/412
11,193,278 B2 * 12/2021 Kim .................... E04G 23/0233
(Continued)

FOREIGN PATENT DOCUMENTS

DE 8231016 * 5/1983
DE 8512251 * 6/1985
(Continued)

*Primary Examiner* — Theodore V Adamos
(74) *Attorney, Agent, or Firm* — JCIPRNET

(57) ABSTRACT

The present disclosure provides a grid fixing apparatus including a spacer-integrated retaining clip and a grid fixing method using the same capable of integrally forming a retaining clip and a spacer, forming a grid fixing apparatus to be tacked into an object through an anchor pin to firmly fix a grid reinforcement material to a surface or an outer side of the object, and fixing the grid reinforcement material in vertical and horizontal directions to precisely construct the grid reinforcement material and capable of being applied to all grid reinforcement materials manufactured in a lattice shape, such as a metallic mesh, a geogrid, and a textile grid made of a high-strength fiber, and being utilized in construction of a grid reinforcement material to which various binders such as concrete, mortar, a pavement material, and a finishing material are applied.

16 Claims, 21 Drawing Sheets

(56) References Cited

U.S. PATENT DOCUMENTS

| | | | |
|---|---|---|---|
| 2016/0069067 A1* | 3/2016 | Ciuperca | E04B 1/7633 |
| | | | 52/309.8 |
| 2017/0334162 A1 | 11/2017 | Karie et al. | |
| 2019/0284824 A1* | 9/2019 | Thompson | E04C 5/168 |
| 2020/0263416 A1* | 8/2020 | Walsh | E04C 2/288 |
| 2021/0293026 A1* | 9/2021 | Chich | E06B 3/9608 |

FOREIGN PATENT DOCUMENTS

| | | | |
|---|---|---|---|
| DE | 102020101125 A1 * | 7/2021 | |
| JP | 2000220304 A * | 8/2000 | |
| KR | 102300812 B1 * | 9/2021 | |
| KR | 102404786 B1 * | 6/2022 | |

\* cited by examiner ized retaining clip and a grid fixing method using the same capable of newly constructing a lattice-type grid reinforcement material for grid reinforcement and firmly fixing the grid reinforcement material to a surface or an outer side of an object to be strengthened.

GRID FIXING APPARATUS HAVING SPACER-INTEGRATED RETAINING CLIP FOR GRID REINFORCEMENT AND GRID FIXING METHOD USING THE SAME

CROSS-REFERENCE TO RELATED APPLICATION

This application claims priority to and the benefit of Korean Patent Application No. 2020-0145489, filed on Nov. 3, 2020, the disclosure of which is incorporated herein by reference in its entirety.

BACKGROUND

1. Field of the Invention

The present disclosure relates to a grid fixing apparatus, and more particularly, to a grid fixing apparatus having a spacer-integrated retaining clip and a grid fixing method using the same capable of newly constructing a lattice-type grid reinforcement material for grid reinforcement and firmly fixing the grid reinforcement material to a surface or an outer side of an object to be strengthened.

2. Discussion of Related Art

Generally, a lattice-type geogrid (hereinafter, referred to as "grid") is a reinforcement material used for the purpose of strengthening a retaining wall, strengthening a slope, strengthening the ground, and the like during civil engineering work. In order to serve its purpose, the grid requires high tensile strength and low tensile strain (low elongation) in addition to characteristics such as resistance to installation damage and frictional resistance.

As a method of manufacturing the grid, generally, a method in which plastic is injected or extruded, holes are drilled therein at predetermined intervals, and then the plastic is uniaxially or biaxially stretched is used. However, the lattice-type grid using the injected plastic has low tensile strength, is difficult to manufacture through a continuous process, and has limitations in terms of the size or shape thereof.

Nowadays, a textile grid reinforcement material, which is manufactured by weaving or knitting a high-strength fiber into a lattice-type fabric to prepare a textile grid fabric, covering a surface thereof with a resin coating solution such as polyvinyl chloride, bitumen, an acrylic, latex, and a rubber-based resin, and then performing a high-temperature heat treatment thereon, is effectively utilized in newly constructing and strengthening concrete structures.

Due to using a fiber with higher strength as compared to a plastic grid reinforcement material, the textile grid reinforcement material has high tensile strength and low tensile strain and thus exhibits excellent characteristics as a structural material for construction and strengthening of structures.

FIGS. 1A and 1B are views for describing a textile grid reinforcement material in detail. FIG. 1A illustrates a textile grid reinforcement material, and FIG. 1B is a view showing a textile grid reinforcement material produced using a weaving method.

As illustrated in FIG. 1A, a textile grid reinforcement material (10) is manufactured by weaving or knitting a high-strength fiber, such as a carbon fiber and an aramid fiber, into a lattice-type fabric to prepare a textile grid and then impregnating the textile grid with epoxy, polyester, an acrylate, styrene-butadiene rubber (SBR), and the like.

As illustrated in FIG. 1B, the textile grid reinforcement material (10) consists of weft yarns (10a) and warp yarns (10b). Despite being impregnated with a fiber aggregate (11) and a resin (12), each of the weft yarns (10a) and warp yarns (10b) has enough ductility to allow the textile grid reinforcement material (10) to be wound in the shape of a roll. Due to being woven by twisting the warp yarns (10b), the textile grid reinforcement material (10) produced using the above weaving method has a characteristic in that elongation is higher in a warp direction as compared to a weft direction of the linearly-arranged weft yarns (10a), which is a main direction.

Meanwhile, FIG. 2 is a view showing examples of a front surface and a side surface on which a textile grid reinforcement material according to the related art is mounted.

As illustrated in FIG. 2, in the case of a repair/strengthening method using a textile grid reinforcement material and concrete, holes are drilled in a surface of a concrete structure, a plurality of anchors (20) are installed in the holes, the textile grid reinforcement material (10) is mounted on a fixing apparatus (30), and then concrete is constructed. Such a repair/strengthening method has an advantage in that the textile grid reinforcement material (10) may be precisely mounted but has disadvantages in that an anchor installation speed is low and concrete construction quality on a rear surface of the textile grid reinforcement material is low due to rebounding during the laying of concrete.

Meanwhile, FIGS. 3A to 3C are views showing an example of concrete construction according to the related art.

In the case of a repair/strengthening method using a textile grid reinforcement material and concrete according to the related art, primary concrete is constructed as illustrated in FIG. 3A, a textile grid reinforcement material is mounted and then secondary concrete is constructed as illustrated in FIG. 3B, and then surface finishing is performed as illustrated in FIG. 3C. Such a repair/strengthening method has an advantage in that a construction speed is fast but has disadvantages in that, during construction of the primary concrete and secondary concrete, it is difficult to construct with a precise thickness, and it is difficult to construct on a curved surface and an upper surface of a concrete structure.

As described above, various shapes of grids have been utilized as a reinforcement material in construction or repair/strengthening of structures, external insulation of buildings, construction of pavements, and the like, but the grid reinforcement materials have been constructed without a separate spacer or fixing apparatus for mounting and fixing thereof.

Also, since grids that are used together with various binders during construction or repair/strengthening of structures, external insulation of outer walls of buildings, and construction of pavements serve as reinforcement materials, it is very important to maintain a vertical position, as well as a horizontal direction, of the grid during construction.

In particular, since the grid is provided as a reinforcement material to respond to tensile stress that occurs in a matrix (in a state in which a binder is solidified), the grid maintaining a taut horizontal state without deformation is advantageous in terms of the strengthening effect and matrix cracking control.

However, according to the related art, since there is no separate grid fixing apparatus, there are problems in that it is difficult to precisely construct the grid and the grid may be detached from an object during construction of the grid.

Also, since construction and compaction pressure of a binder, such as concrete, mortar, asphalt, and an elastic rubber pavement material, laid after mounting of the grid cause deformation of the grid, there is difficulty in securing construction quality.

RELATED ART DOCUMENTS

Patent Documents (Patent Document 0001) Korean Patent Registration No. 10-2096032 (Date of Registration: Mar. 26, 2020), Title of Invention: "Anchor pin for placing shotcrete and fixing textile grid, and shotcrete construction method for reinforcing textile grid using the same"
(Patent Document 0002) Korean Patent Registration No. 10-1612800 (Date of Registration: Apr. 8, 2016), Title of Invention: "Technique of repairing and strengthening reinforcing bar concrete structures such as tunnel, bridge, and common duct using lattice-type fiber mesh and cementitious matrix as reinforcement materials to improve load carrying capacity and fire resistance"
(Patent Document 0003) Korean Patent Registration No. 10-1434523 (Date of Registration: Aug. 20, 2014), Title of Invention: "Technique of repairing and seismically retrofitting concrete structure using inorganic cementitious matrix and coated fiber grid"
(Patent Document 0004) Korean Patent Registration No. 10-1169770 (Date of Registration: Jul. 24, 2012), Title of Invention: "Concrete structure using release steel wire net and technique of strengthening the same"
(Patent Document 0005) Korean Patent Registration No. 10-1994852 (Date of Registration: Jun. 25, 2019), Title of Invention: "Concrete structure using reinforcing panel having embedded lattice reinforcement material and method of repairing and strengthening the same"
(Patent Document 0006) Korean Patent Registration No. 10-2003670 (Date of Registration: Jul. 19, 2019), Title of Invention: "Textile grid reinforced concrete structure using textile grid fixing apparatus and construction method thereof"

SUMMARY OF THE INVENTION

The present disclosure is directed to providing a grid fixing apparatus having a spacer-integrated retaining clip for grid reinforcement and a grid fixing method using the same capable of integrally forming a retaining clip and a spacer, forming a grid fixing apparatus to be tacked into an object through an anchor pin to firmly fix a grid reinforcement material to a surface or an outer side of the object, and fixing the grid reinforcement material in vertical and horizontal directions to precisely construct the grid reinforcement material.

The present disclosure is also directed to providing a grid fixing apparatus having a spacer-integrated retaining clip for grid reinforcement and a grid fixing method using the same capable of being applied to all grid reinforcement materials manufactured in a lattice shape, such as a metallic mesh, a geogrid, and a textile grid made of a high-strength fiber, and capable of being utilized in the construction of a grid reinforcement material to which various binders such as concrete, mortar, a pavement material, and a finishing material are applied.

The present disclosure provides a grid fixing apparatus having a spacer-integrated retaining clip for grid reinforcement, which is a grid fixing apparatus for grid reinforcement of an object, the grid fixing apparatus including: a retaining clip which has a first through-hole formed in a central portion and comes in direct contact with a lattice-type grid reinforcement material so that the grid reinforcement material is fixed; a spacer which has a second through-hole corresponding to the first through-hole formed therein and which is integrally formed with a lower surface of the retaining clip so that the retaining clip maintains a predetermined distance from an object; and an anchor pin which is tacked using a tacker or tacking device and passes through the first through-hole formed in the retaining clip and the second through-hole formed in the spacer to be tacked into the object, wherein the grid reinforcement material is fixed in vertical and horizontal directions by the retaining clip in a state in which the grid reinforcement material maintains a predetermined distance from the object by the spacer so that the grid reinforcement material is precisely constructed on the object.

Here, the retaining clip may be made of a noncorrosive metal, plastic, or polypropylene and may be formed in a cross shape, a linear shape, a quadrilateral shape, or a circular shape.

Here, the grid reinforcement material may be fixed to one side or both sides of an upper surface of the retaining clip, and the retaining clip may be simply mounted or the grid reinforcement material may be fixed thereto using an adhesive.

Here, when the retaining clip is formed to be stacked above and below the grid reinforcement material, in addition to a first spacer for maintaining a distance from the object, a second spacer corresponding to a diameter of the grid reinforcement material may be formed to be stacked.

Here, the anchor pin may include a tip portion sharply formed so that the anchor pin is tacked into the object, a body portion which has one side connected to the tip portion and the other side connected to a head portion, and the head portion formed at the other side of the body portion to allow hitting to be performed using the tacker or tacking device.

Meanwhile, the present disclosure also provides a grid fixing method using a spacer-integrated grid fixing apparatus for grid reinforcement, which is a grid fixing method using a grid fixing apparatus for grid reinforcement of an object, the grid fixing method including: a) mounting a grid reinforcement material in close contact with an object subject to grid reinforcement; b) mounting a spacer and a retaining clip of a grid fixing apparatus on the grid reinforcement material; and c) passing an anchor pin of the grid fixing apparatus through the retaining clip and the spacer to tack the anchor pin of the grid fixing apparatus into the object, wherein the object is concrete, an outer wall body, or a pavement base layer, and the grid reinforcement material is fixed in vertical and horizontal directions by the retaining clip in a state in which the grid reinforcement material maintains a predetermined distance from the object by the spacer so that the grid reinforcement material is precisely constructed on the object.

Meanwhile, the present disclosure also provides a grid fixing method using a spacer-integrated grid fixing apparatus for grid reinforcement, which is a grid fixing method using a grid fixing apparatus for grid reinforcement of an object, the grid fixing method including: a) mounting a grid reinforcement material on an object subject to grid reinforcement so that the grid reinforcement material is spaced apart therefrom; b) mounting a first spacer and a first retaining clip of a grid fixing apparatus on a lower portion of the grid reinforcement material; c) forming a second spacer and a second retaining clip on an upper portion of the first spacer and the first retaining clip and inserting and fixing the grid reinforcement material between the first and second retaining clips; d) passing an anchor pin of the grid fixing apparatus through the second retaining clip, the second spacer, the first retaining clip, and the first spacer to tack the anchor pin of the grid fixing apparatus into the object; and e) constructing a binder on an entire surface of the grid reinforcement material, wherein the grid reinforcement material is fixed in vertical and horizontal directions by the retaining clips in a state in which the grid reinforcement material maintains a predetermined distance from the object by the spacers so that the grid reinforcement material is precisely constructed on the object.

Meanwhile, the present disclosure also provides a grid fixing method using a spacer-integrated grid fixing apparatus for grid reinforcement, which is a grid fixing method using a grid fixing apparatus for grid reinforcement of an object, the grid fixing method including: a) constructing a first binder on an object subject to grid reinforcement; b) mounting a grid reinforcement material in close contact with a surface of a layer of the first binder; c) mounting a spacer and a retaining clip of a grid fixing apparatus on the grid reinforcement material; d) passing an anchor pin of the grid fixing apparatus through the retaining clip and the spacer to tack the anchor pin of the grid fixing apparatus into the object; and e) constructing a second binder on an entire surface of the grid reinforcement material, wherein the grid reinforcement material is fixed in vertical and horizontal directions by the retaining clip in a state in which the grid reinforcement material maintains a predetermined distance from the object by the spacer so that the grid reinforcement material is precisely constructed on the object.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which:

FIG. 7B is a view illustrating a tacking device for tacking the anchor pin;

DETAILED DESCRIPTION OF EXEMPLARY EMBODIMENTS

Figure 1A:
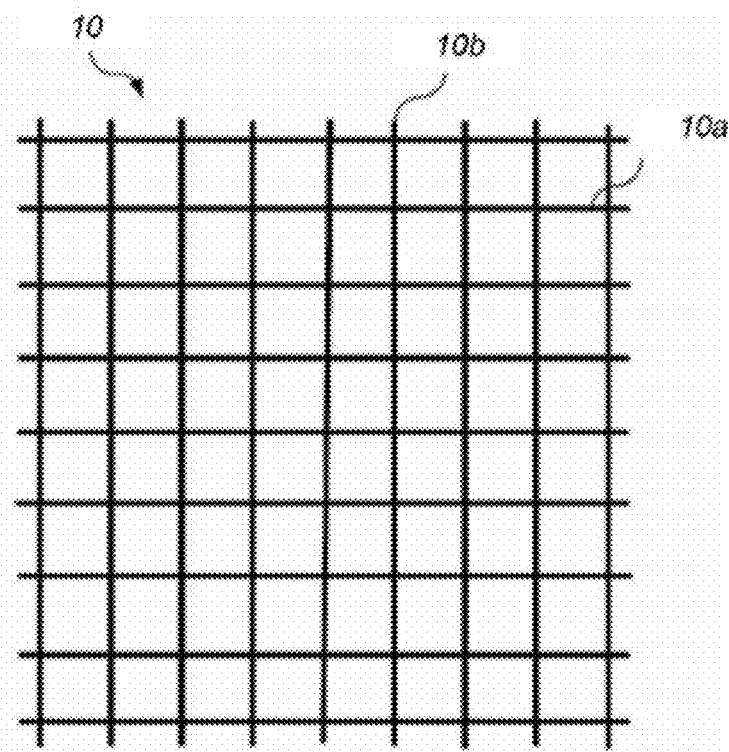
FIGS. 1A and 1B are views illustrating a textile grid reinforcement material.
Figure 1B:
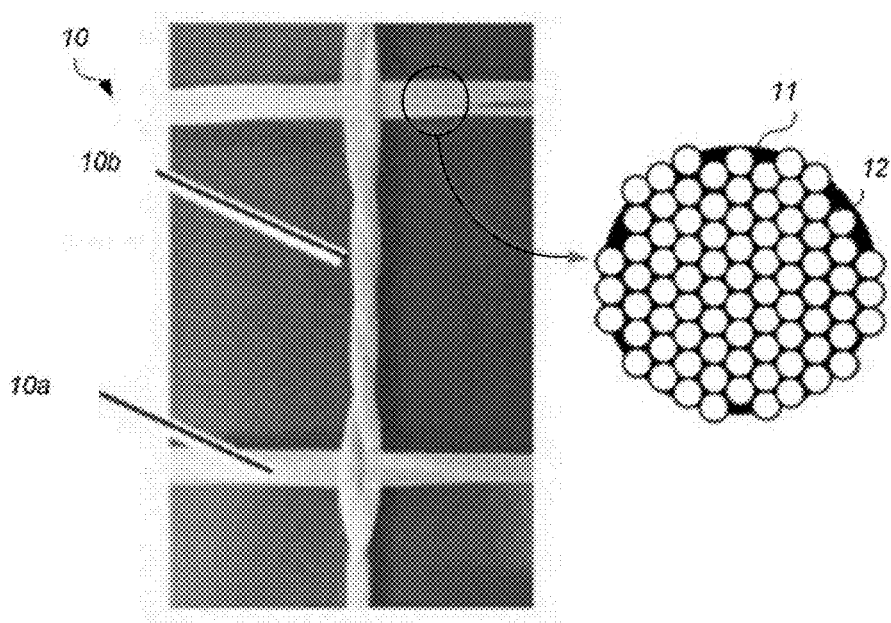
Figure 2:
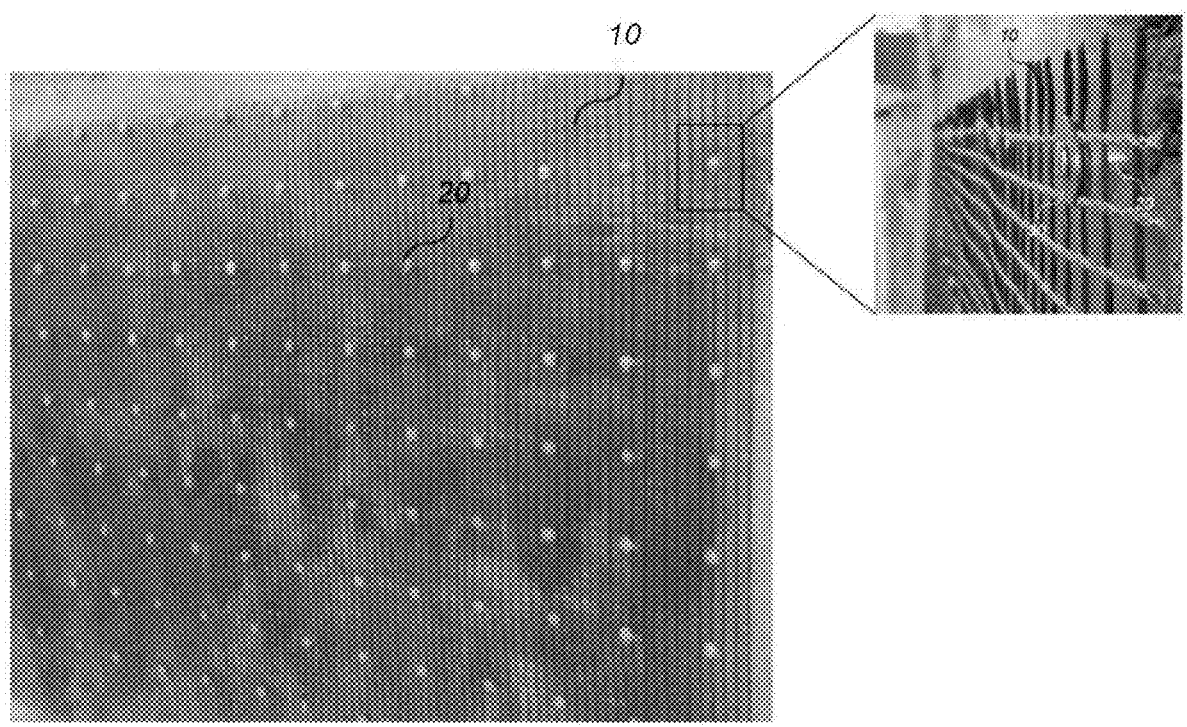
FIG. 2 is a view showing examples of a front surface and a side surface on which the textile grid reinforcement material according to the related art is mounted.
Figure 3A:
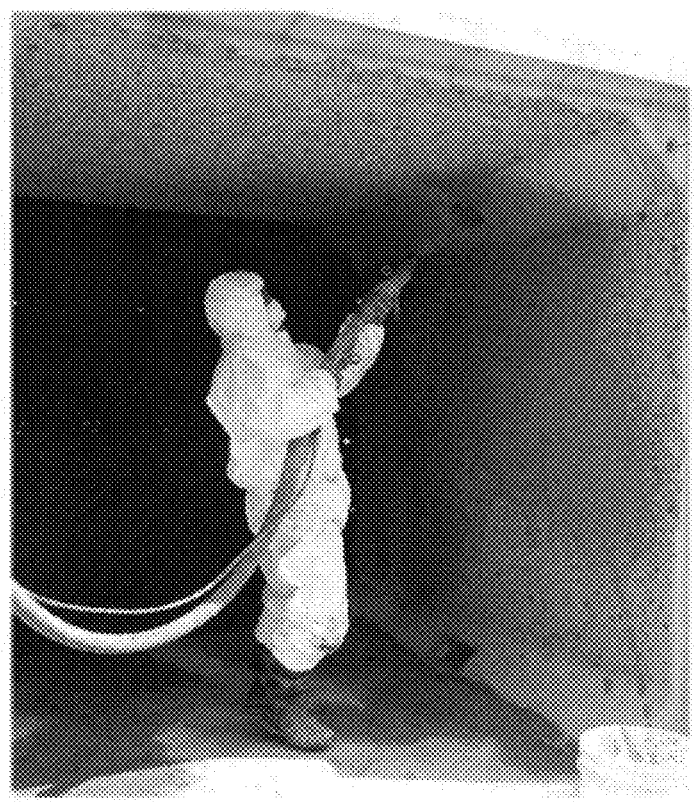
FIGS. 3A to 3C are views showing an example of concrete construction according to the related art.
Figure 3B:
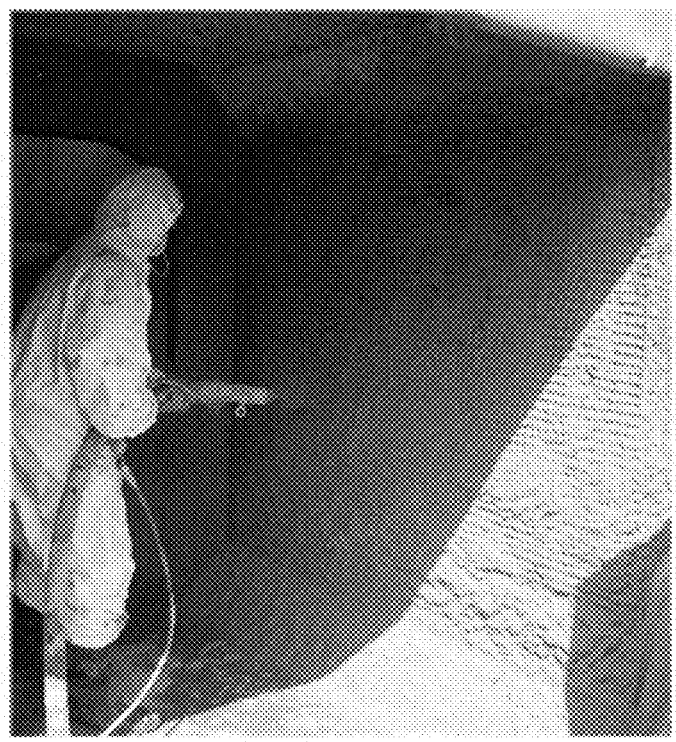
Figure 3C:
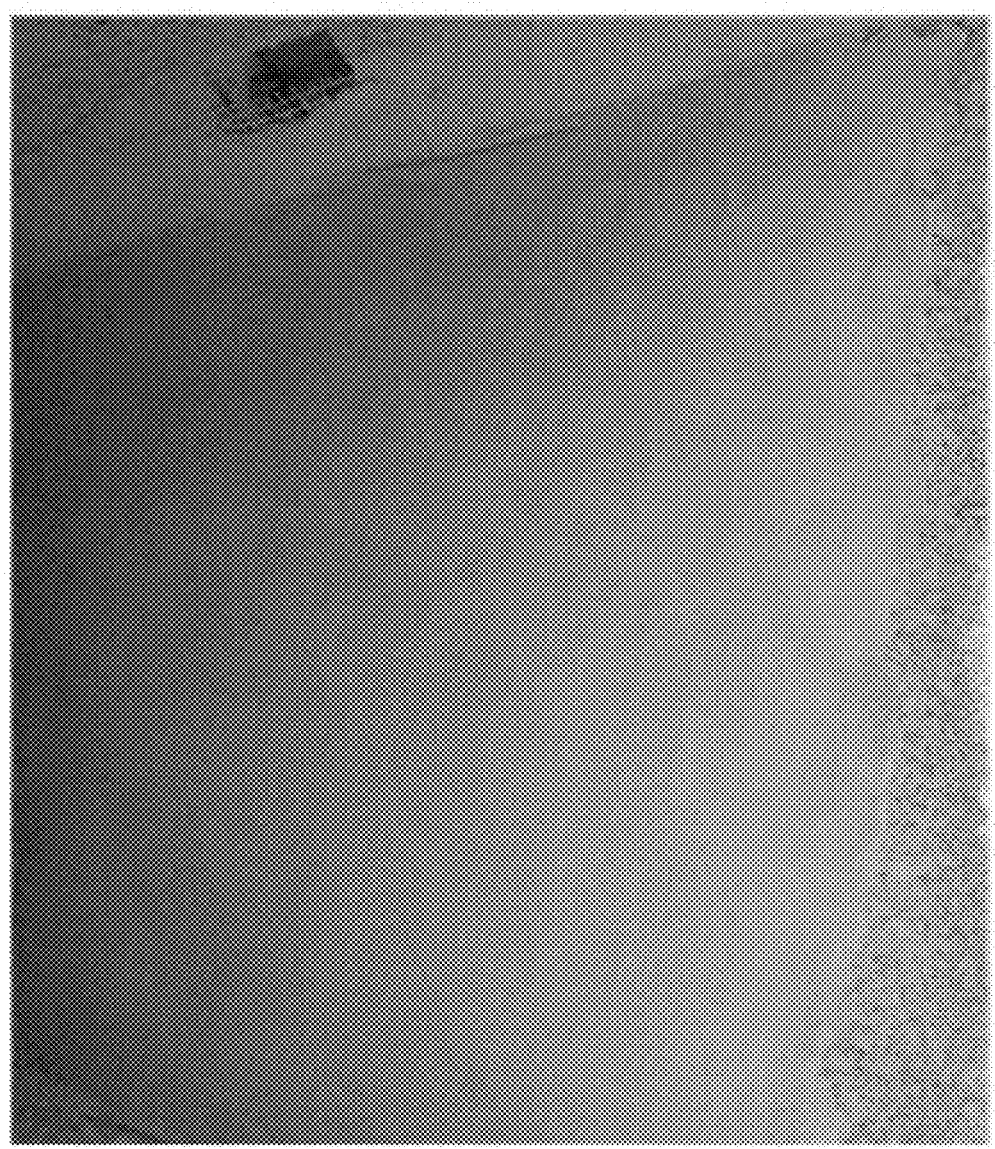

Hereinafter, embodiments of the present disclosure will be described in detail with reference to the accompanying drawings to allow those of ordinary skill in the art to which the present disclosure pertains to easily practice the present disclosure. However, the present disclosure may be implemented in various different forms and is not limited by the embodiments described herein. Also, in order to clearly describe the present disclosure, parts unrelated to the description have been omitted from the drawings, and similar parts will be denoted by like reference numerals throughout the specification.

Throughout the specification, when a certain part is described as "including" a certain element, this indicates that the certain part may further include another element instead of excluding another element unless the context clearly indicates otherwise.

[Grid Fixing Apparatus 200 Including Spacer-Integrated Retaining Clip for Grid Reinforcement]

Figure 4A:
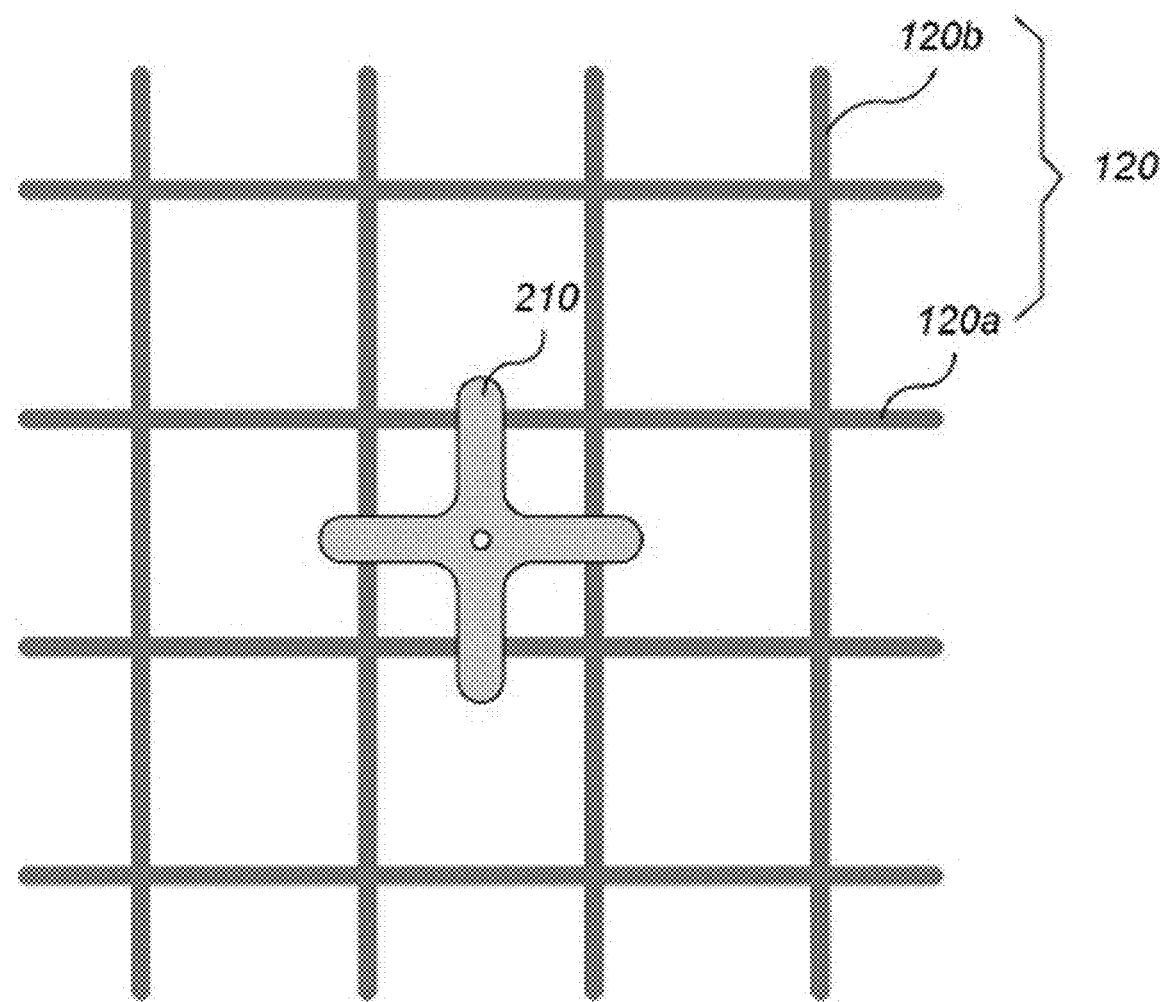
FIG. 4A to 4C are views illustrating a grid fixing apparatus including a spacer-integrated retaining clip for grid reinforcement according to an embodiment of the present disclosure.
Figure 4B:
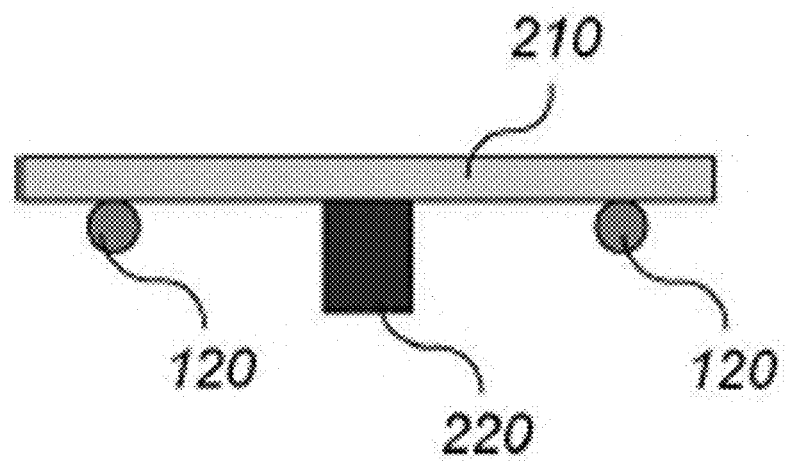
Figure 4C:
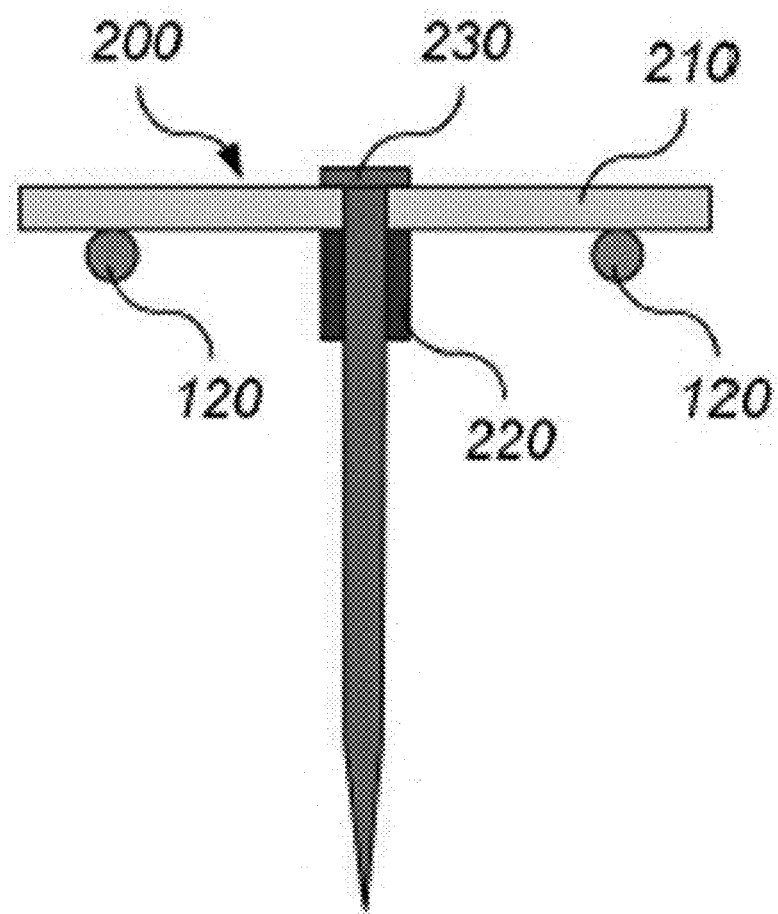

FIG. 4A to 4C are views illustrating a grid fixing apparatus including a spacer-integrated retaining clip for grid reinforcement according to an embodiment of the present disclosure. FIG. 4A is a front view illustrating a state in which the spacer-integrated retaining clip is mounted on a grid reinforcement material, FIG. 4B is a lateral view illustrating the state in which the spacer-integrated retaining clip is mounted on the grid reinforcement material, and FIG. 4C is a view illustrating the grid fixing apparatus into which an anchor pin is tacked.

As illustrated in FIGS. 4A to 4C, a grid fixing apparatus 200 including a spacer-integrated retaining clip for grid reinforcement according to the embodiment of the present disclosure includes a retaining clip 210, a spacer 220, and an anchor pin 230.

The retaining clip 210 has a first through-hole h1 formed in a central portion and comes in direct contact with a grid reinforcement material 120 so that the grid reinforcement material 120 is fixed. Here, the retaining clip 210 may be formed in a cross shape, a linear shape, a quadrilateral shape, or a circular shape.

Figure 8:
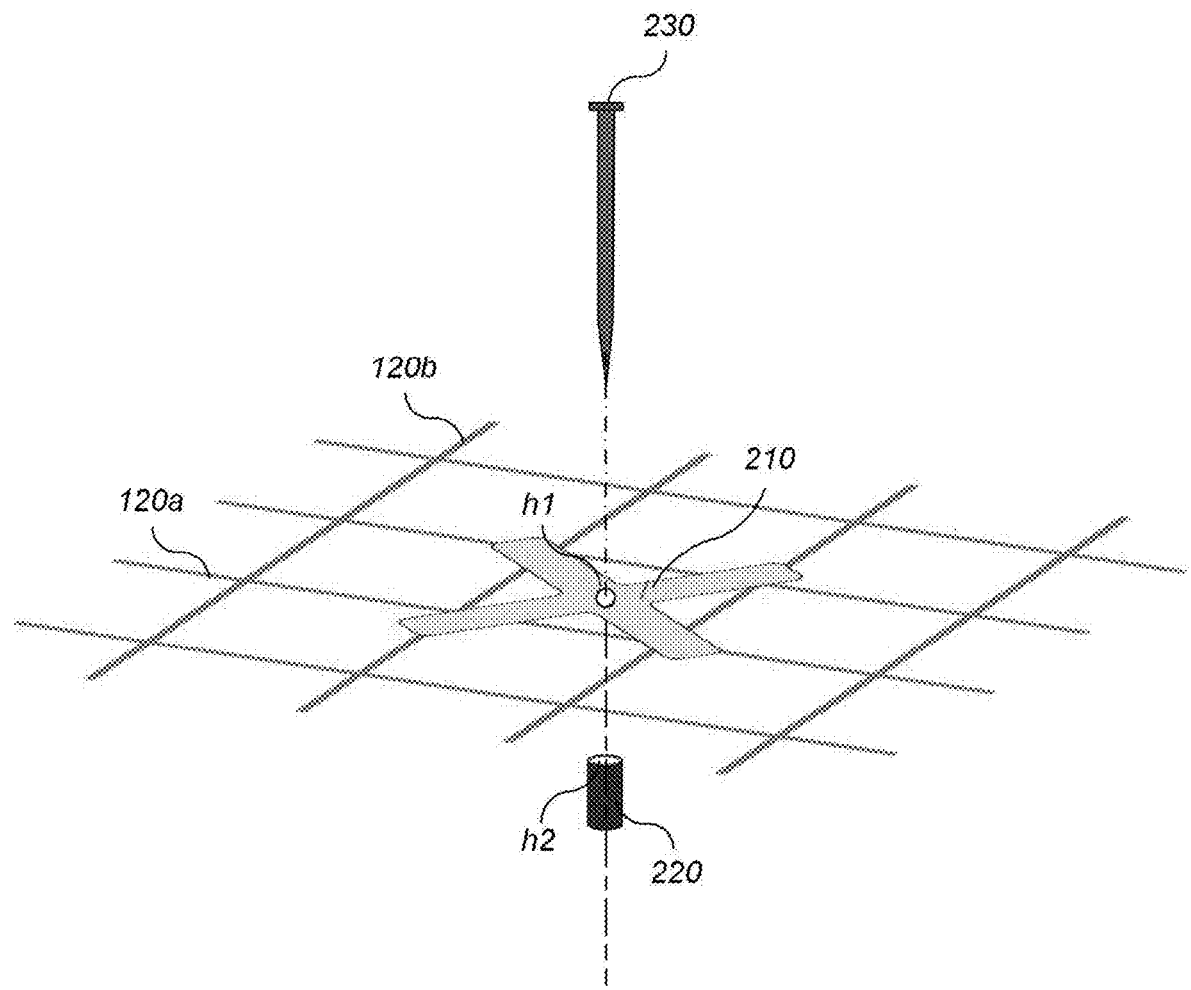
FIG. 8 is a view illustrating a state in which the anchor pin of the grid fixing apparatus including a spacer-integrated retaining clip for grid reinforcement according to an embodiment of the present disclosure is installed to pass through a retaining clip and a spacer.

The spacer 220 is formed in a cylindrical shape and is integrally formed with a lower surface of the retaining clip 210 so that the retaining clip 210 maintains a predetermined distance from an object 110. As illustrated in FIG. 8 which will be described below, a second through-hole h2 corresponding to the first through-hole h1 is formed in the spacer 220.

The anchor pin 230 passes through the first through-hole h1 formed in the retaining clip 210 and the second through-hole h2 formed in the spacer 220 to be tacked into the object 110.

Figure 5A:
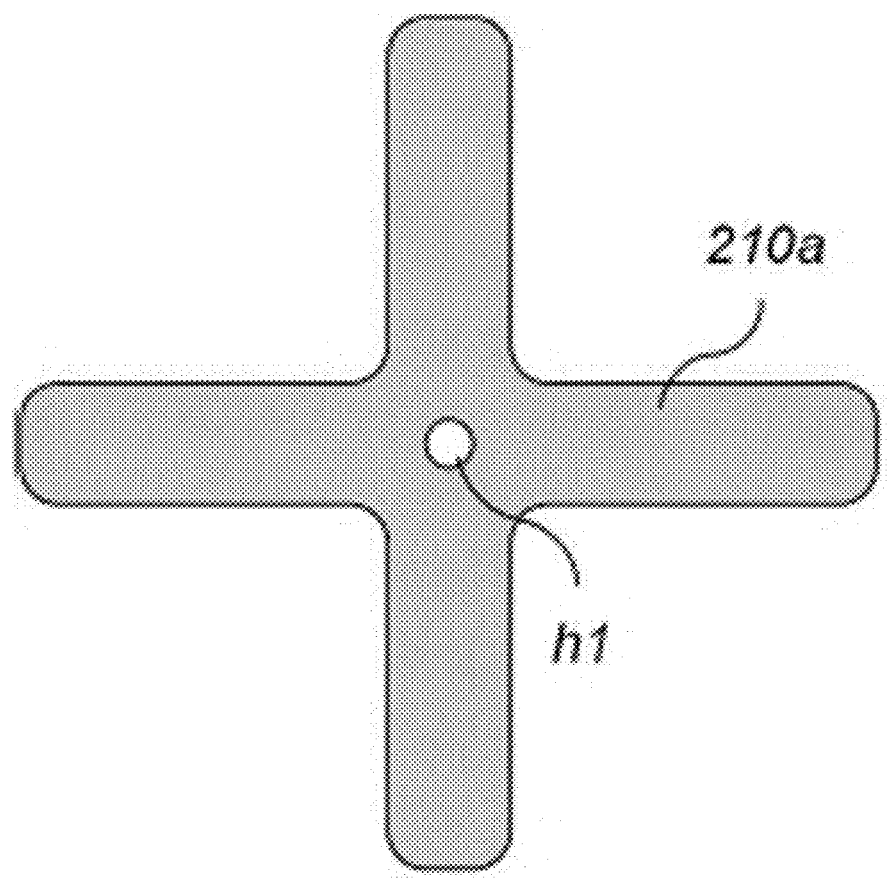
FIG. 5A to 5C are views illustrating various types of retaining clips of the grid fixing apparatus including a spacer-integrated retaining clip for grid reinforcement according to an embodiment of the present disclosure.
Figure 5B:
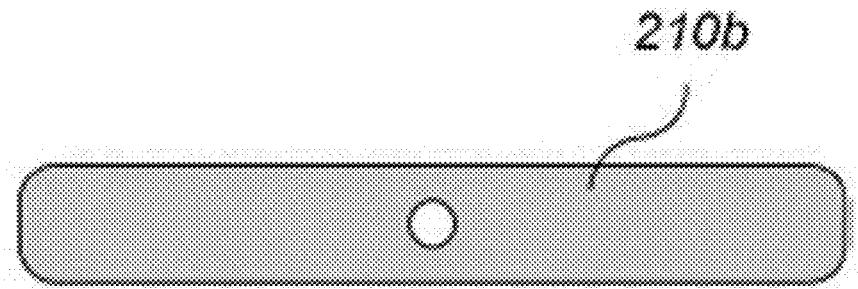
Figure 5C:
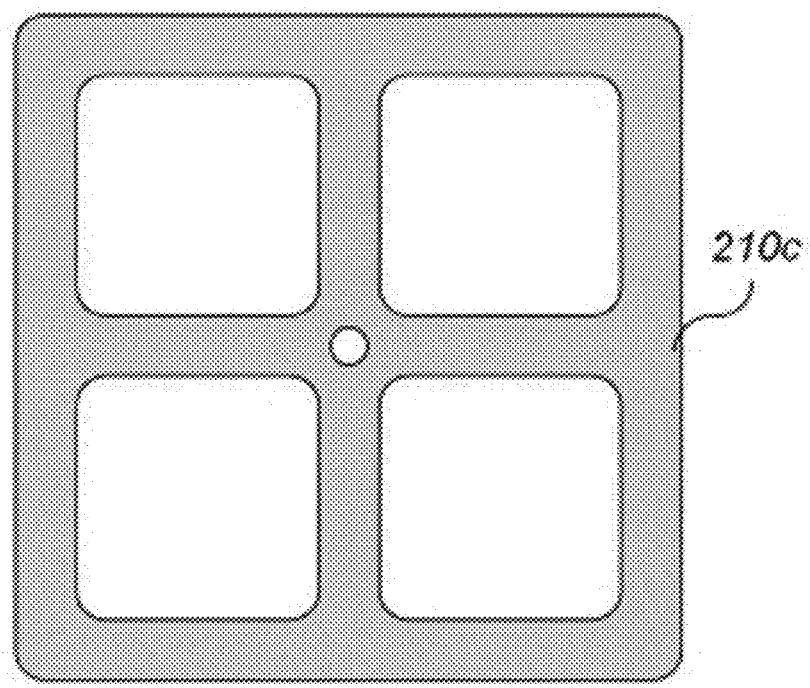

Meanwhile, FIG. 5A to 5C are views illustrating various types of retaining clips of the grid fixing apparatus including a spacer-integrated retaining clip for grid reinforcement according to the embodiment of the present disclosure. FIG. 5A illustrates a cross-shaped retaining clip 210a, FIG. 5B illustrates a linear retaining clip 210b, and FIG. 5C illustrates a quadrilateral retaining clip 210c.

In the case of the grid fixing apparatus 200 including a spacer-integrated retaining clip for grid reinforcement according to the embodiment of the present disclosure, as illustrated in FIG. 5A to 5C, the shape of the retaining clip 210 is not limited and the retaining clip 210 may be manufactured in various shapes such as the cross shape illustrated in FIG. 5A, the linear shape illustrated in FIG. 5B, the quadrilateral shape illustrated in FIG. 5C, and a circular shape. Also, a material of the retaining clip 210 is not limited and the retaining clip 210 may be made of a noncorrosive metal, plastic, polypropylene, and the like.

Also, the retaining clip 210 serves to fix the grid reinforcement material 120, and preferably, a surface area of the retaining clip 210 may be minimized to allow a binder, which is laid after mounting the grid reinforcement material, to be integrally formed therewith. For example, in the case of the quadrilateral retaining clip 210c illustrated in FIG. 5C, a through-hole is formed in the central portion and a plurality of openings are formed to minimize the surface area of the quadrilateral retaining clip 210c, and a binder may be laid through the openings.

Figure 6A:
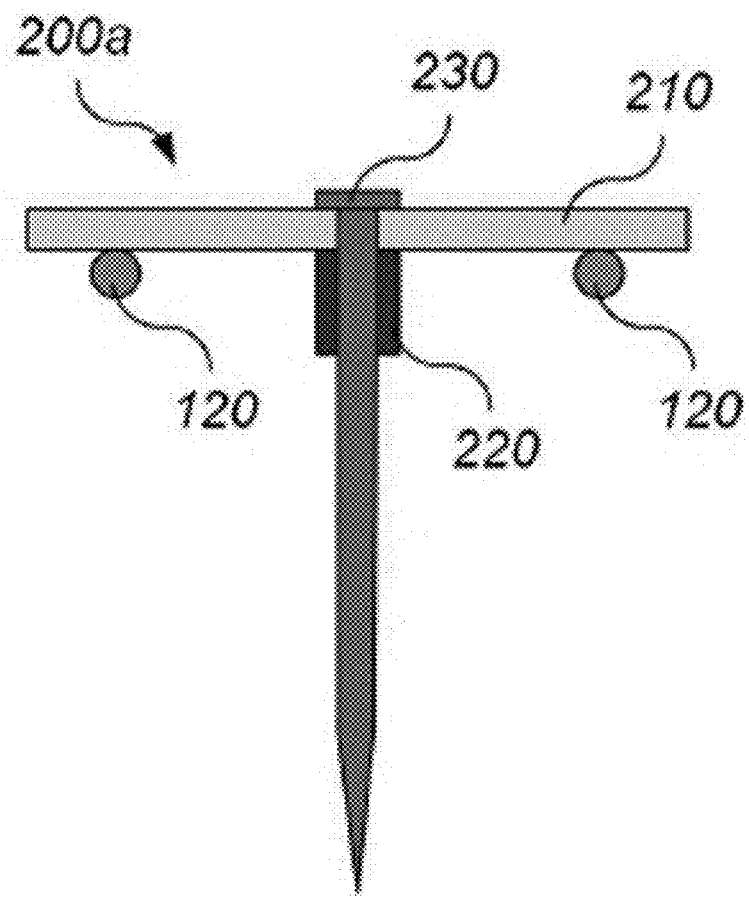
FIG. 6A to 6C are views illustrating various types of grid fixing apparatuses including a spacer-integrated retaining clip for grid reinforcement according to an embodiment of the present disclosure.
Figure 6B:
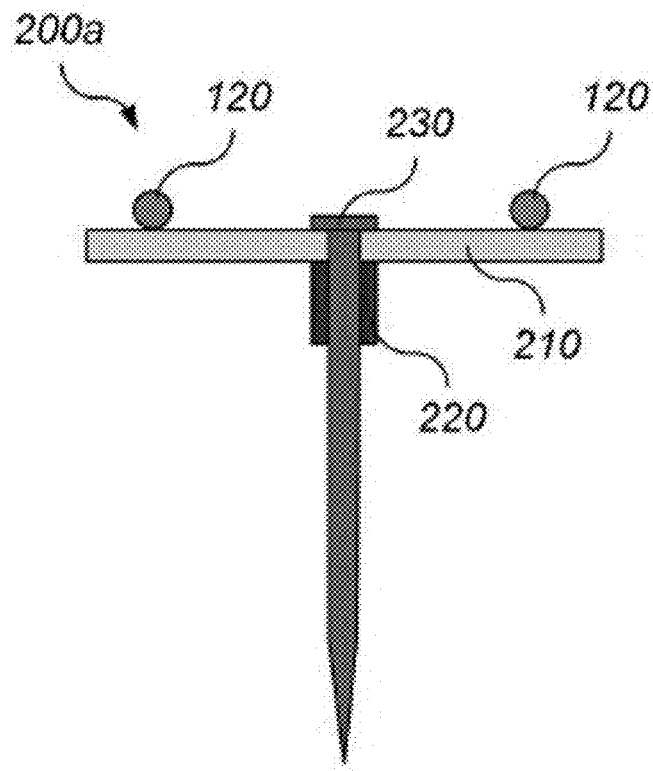
Figure 6C:
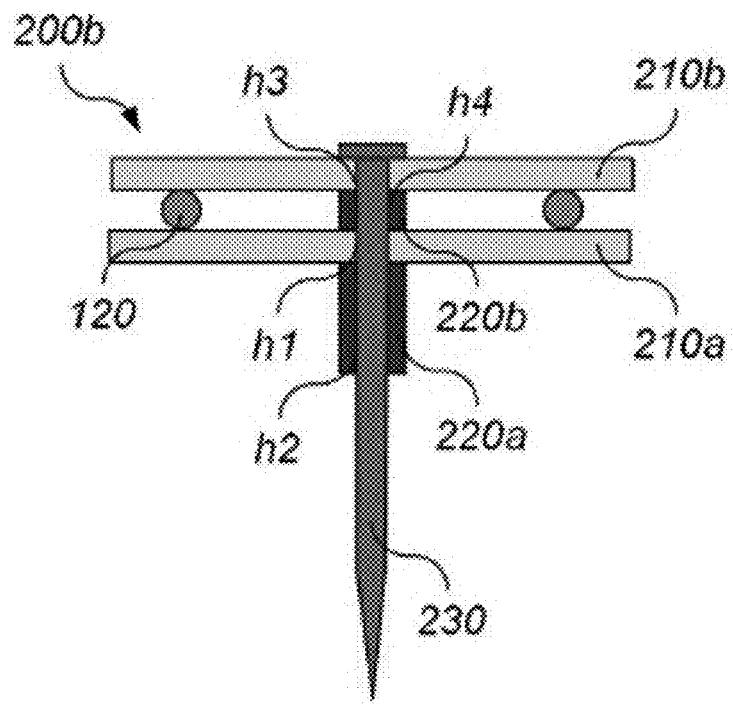

Meanwhile, FIG. 6A to 6C are views illustrating various types of grid fixing apparatuses including a spacer-integrated retaining clip for grid reinforcement according to an embodiment of the present disclosure.

In a grid fixing apparatus 200a including a spacer-integrated retaining clip for grid reinforcement according to an embodiment of the present disclosure, the grid reinforcement material 120 may be fixed to one side or both sides of a lower surface of the retaining clip 210 as illustrated in FIG. 6A, or the grid reinforcement material 120 may be fixed to one side or both sides of an upper surface of the retaining clip 210 as illustrated in FIG. 6B. Here, the retaining clip 210 may be simply mounted, or the grid reinforcement material 120 may be fixed to the retaining clip 210 using an adhesive.

Also, when retaining clips 210a and 210b are formed on the top and bottom of the grid reinforcement material 120 or formed on both sides thereof as illustrated in FIG. 6C, in addition to a first spacer 220a for maintaining a distance from the object, a second spacer 220b corresponding to a diameter of the grid reinforcement material 120 may be formed to be stacked.

Specifically, as illustrated in FIG. 6C, a grid fixing apparatus 200b may include a first retaining clip 210a which has the first through-hole h1 formed in a central portion and comes in direct contact with the lattice-type grid reinforcement material 120 so that the grid reinforcement material 120 is fixed, the first spacer 220a which has the second through-hole h2 corresponding to the first through-hole h1 formed therein and which is integrally formed with a lower surface of the first retaining clip 210a so that the first retaining clip 210a maintains a predetermined distance from an object 310, a second retaining clip 210b which is formed to be stacked on the first retaining clip 210a, has a third through-hole h3 formed in a central portion, and comes in direct contact with the grid reinforcement material 120, the second spacer 220b which has a length corresponding to the diameter of the grid reinforcement material 120 and a fourth through-hole h4 corresponding to the third through-hole h3 formed therein, is formed to be stacked on the first spacer 220a, and is integrally formed with a lower surface of the second retaining clip 210b, and the anchor pin 230 which is tacked using a tacker or tacking device 500 and which passes through the third through-hole h3, the fourth through-hole h4, the first through-hole h1, and the second through-hole h2 to be tacked into the object 310.

Figure 7A:
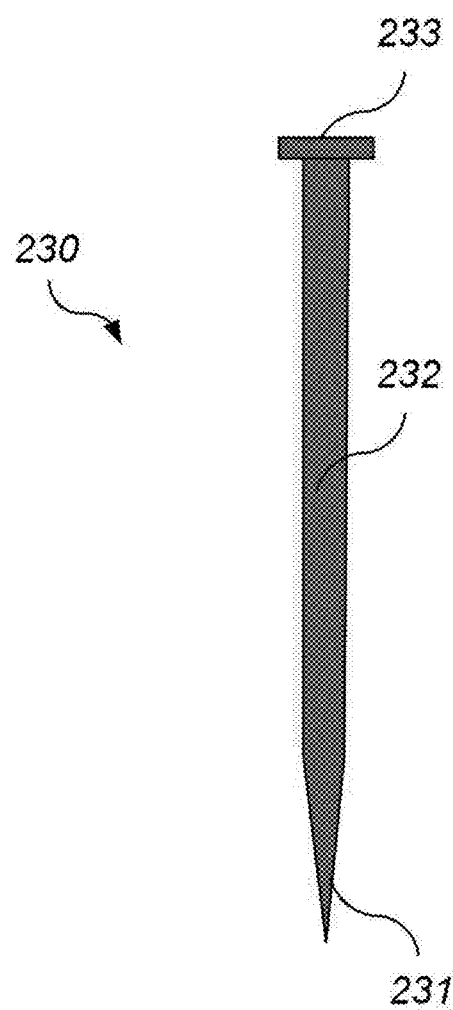
FIGS. 7A and 7B are views illustrating an anchor pin of the grid fixing apparatus including a spacer-integrated retaining clip for grid reinforcement according to an embodiment of the present disclosure.
Figure 7B:
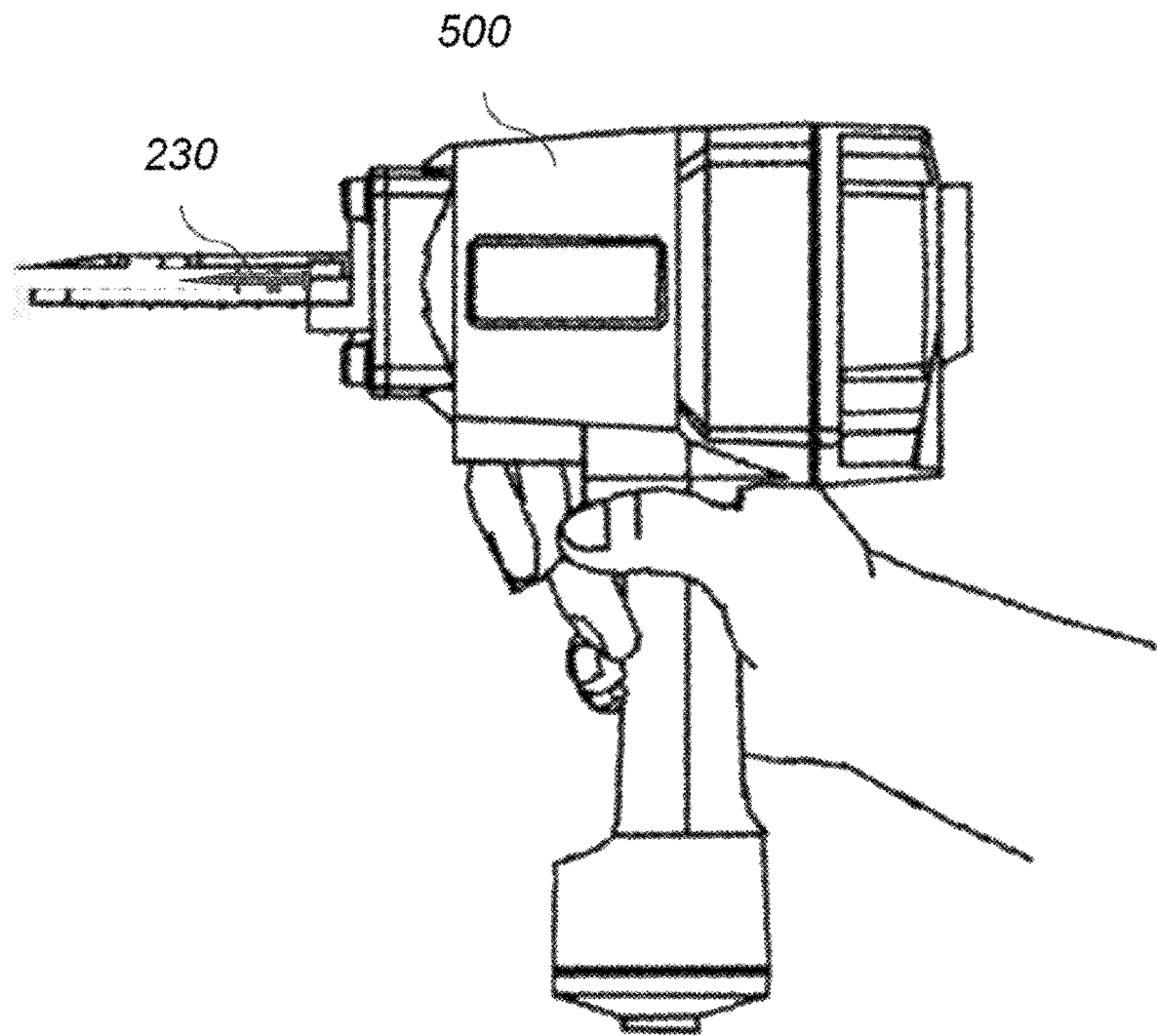

Meanwhile, FIG. 7A is a view illustrating an anchor pin of the grid fixing apparatus including a spacer-integrated retaining clip for grid reinforcement according to an embodiment of the present disclosure, and FIG. 7B is a view illustrating a tacker or tacking device for tacking the anchor pin.

Referring to FIG. 7A, in the grid fixing apparatus 200 including a spacer-integrated retaining clip for grid reinforcement according to the embodiment of the present disclosure, the anchor pin 230 includes a tip portion 231, a body portion 232, and a head portion 233.

The tip portion 231 is sharply formed so that the anchor pin 230 is tacked into the object 110.

The body portion 232 has one side connected to the tip portion 231 and the other side connected to the head portion 233.

The head portion 233 is formed at the other side of the body portion 232 to allow hitting to be performed.

Here, the anchor pin 230 is preferably made of a noncorrosive steel material having a strength that allows the anchor pin 230 to be tacked into the object 110, e.g., a concrete structure. The anchor pin 230 may be manufactured in the form of a nail. Here, the anchor pin 230 may be installed by impact-tacking, drilling, or the like, but in order to improve an installation speed, the anchor pin 230 may be manufactured in the form of a power-actuated fastener (PAF), which uses compressed air or gunpowder, and installed to be fixed to the object 110 at a rapid speed. Also, as illustrated in FIG. 7B, the anchor pin 230 may be manufactured as a magazine and loaded in the tacker or tacking device 500 to be continuously installed at a rapid speed.

Meanwhile, FIG. 8 is a view illustrating a state in which the anchor pin of the grid fixing apparatus including a spacer-integrated retaining clip for grid reinforcement according to the embodiment of the present disclosure is installed to pass through a retaining clip and a spacer.

In the case of the grid fixing apparatus 200 including a spacer-integrated retaining clip for grid reinforcement according to the embodiment of the present disclosure, as illustrated in FIG. 8, the retaining clip 210 and the spacer 220 are mounted on the grid reinforcement material 120, which is made of weft yarns 120a and warp yarns 120b, to fix the grid reinforcement material 120, and then the anchor pin 230 may be installed to pass through each of the retaining clip 210, which is for fixing the grid, and the spacer 220 to be tacked into the object.

Consequently, according to the embodiment of the present disclosure, a retaining clip and a spacer may be integrally formed, and a grid fixing apparatus may be formed to be tacked into an object through an anchor pin to firmly fix a grid reinforcement material to a surface or an outer side of the object. Accordingly, the grid reinforcement material is fixed in vertical and horizontal directions, and thus the grid reinforcement material may be precisely constructed.

Figure 9:
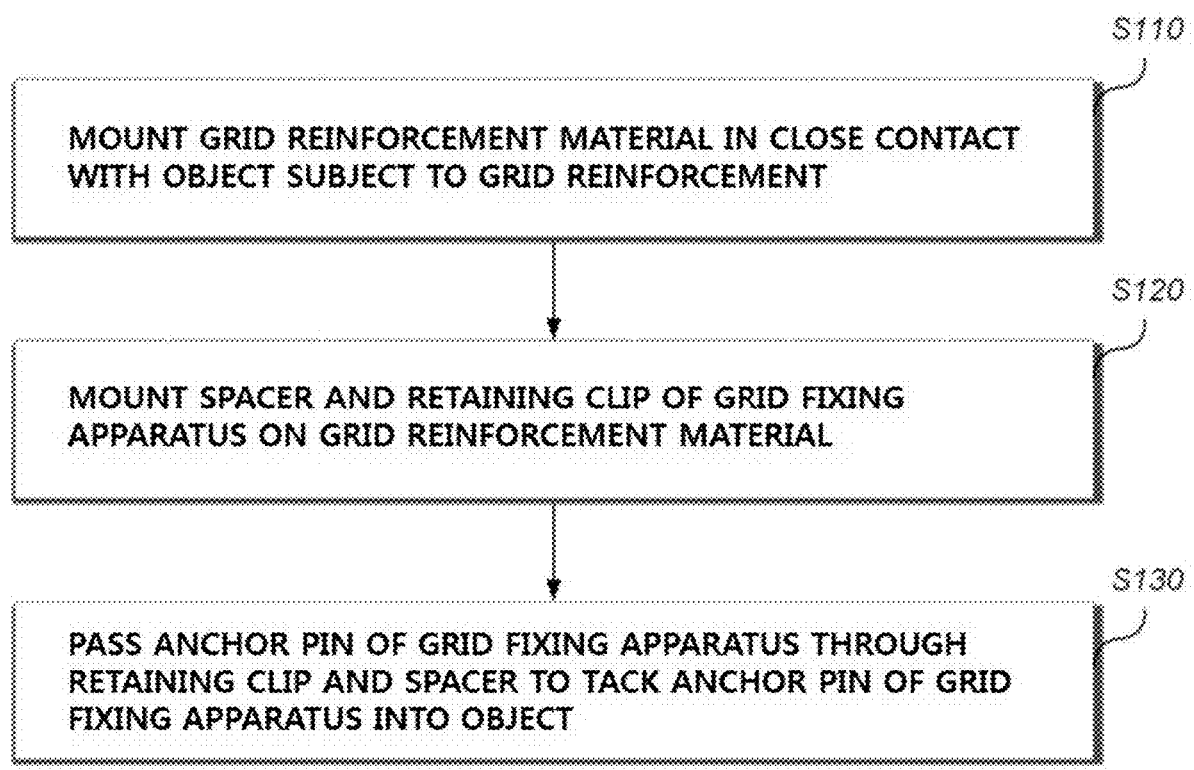
FIG. 9 is an operational flowchart of a grid fixing method using a grid fixing apparatus including a spacer-integrated retaining clip according to a first embodiment of the present disclosure.

First Embodiment: Grid Fixing Method Using Grid Fixing Apparatus Including Spacer-Integrated Retaining Clip FIG. 9 is an operational flowchart of a grid fixing method using a grid fixing apparatus including a spacer-integrated retaining clip according to a first embodiment of the present disclosure, and FIGS. 10A to 10C are views for describing the grid fixing method using a grid fixing apparatus including a spacer-integrated retaining clip according to the first embodiment of the present disclosure in detail.

Figure 10A:
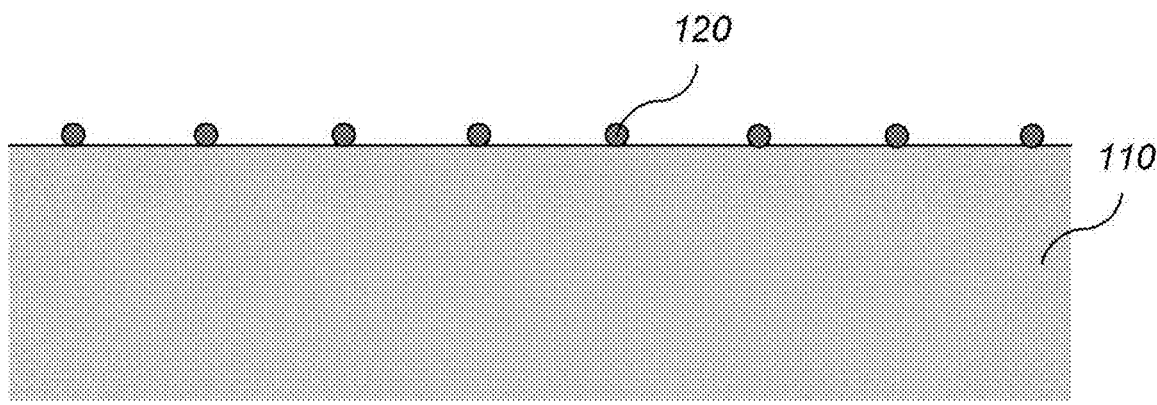
FIGS. 10A to 10C are views for describing the grid fixing method using a grid fixing apparatus including a spacer-integrated retaining clip according to the first embodiment of the present disclosure in detail.

Referring to FIG. 9 and FIGS. 10A to 10C, in the grid fixing method using a grid fixing apparatus including a spacer-integrated retaining clip according to the first embodiment of the present disclosure, which is a grid fixing method using a grid fixing apparatus for grid reinforcement of an object, first, as illustrated in FIG. 10A, the grid reinforcement material 120 is mounted in close contact with the object 110 subject to grid reinforcement (S110).

Figure 10B:
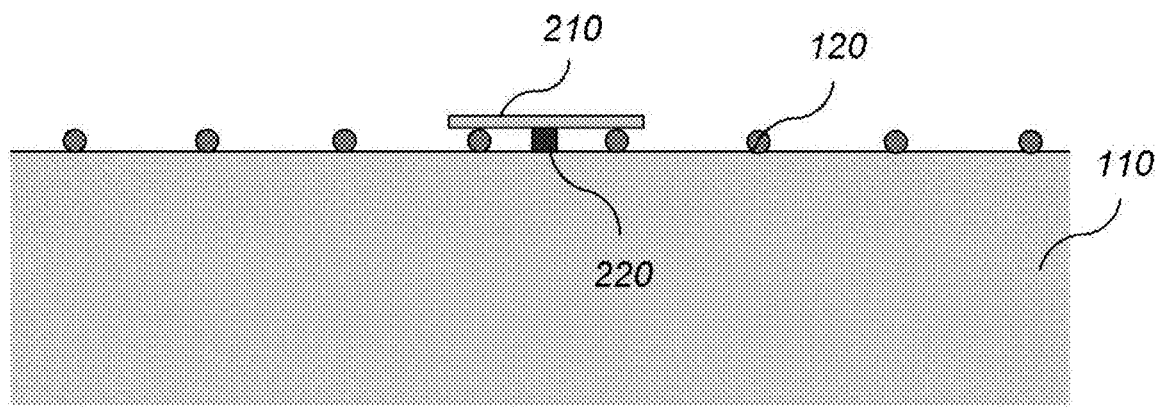

Next, as illustrated in FIG. 10B, the spacer 220 and the retaining clip 210 of the grid fixing apparatus 200 are mounted on the grid reinforcement material 120 (S120). Here, the grid fixing apparatus 200 may include the retaining clip 210 which has the first through-hole h1 formed in the central portion and comes in direct contact with the lattice-type grid reinforcement material 120 so that the grid reinforcement material 120 is fixed, the spacer 220 which has the second through-hole h2 corresponding to the first through-hole h1 formed therein and which is integrally formed with a lower surface of the retaining clip 210 so that the retaining clip 210 maintains a predetermined distance from the object 110, and the anchor pin 230 which is tacked using the tacker or tacking device 500 and which passes through the first through-hole h1 formed in the retaining clip 210 and the second through-hole h2 formed in the spacer 220 so as to be tacked into the object 110.

Figure 10C:
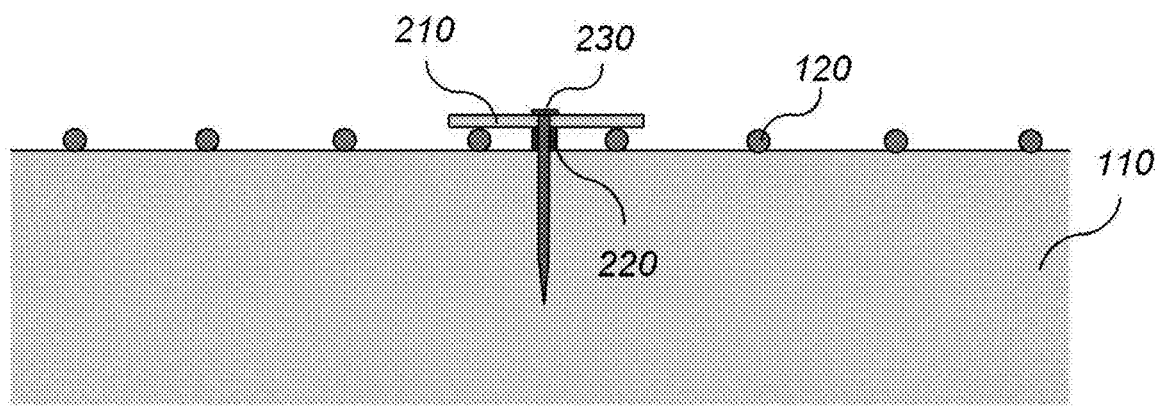

Next, as illustrated in FIG. 10C, the anchor pin 230 of the grid fixing apparatus 200 is tacked into the object 110 by passing through the retaining clip 210 and the spacer 220 (S130). Here, the anchor pin 230 may include the tip portion 231 sharply formed so that the anchor pin 230 is tacked into the object 110, the body portion 232 of which one side is connected to the tip portion 231 and the other side is connected to the head portion 233, and the head portion 233 formed at the other side of the body portion 232 to allow hitting to be performed using the tacker or tacking device 500.

Accordingly, since the grid reinforcement material 120 is fixed in vertical and horizontal directions by the retaining clip 210 in a state in which the grid reinforcement material 120 maintains a predetermined distance from the object 110 by the spacer 220, the grid reinforcement material 120 may be precisely constructed on the object 110.

According to the first embodiment of the present disclosure, the grid reinforcement material 120 is mounted on an upper surface or an outer side of the object 110 such as concrete, an outer wall body, or a pavement base layer, and then the grid fixing apparatus 200 is used to construct the grid reinforcement material 120 in close contact with the object 110. Here, the first spacer 220a corresponding to a diameter of the grid reinforcement material 120 is provided.

The grid fixing method using a grid fixing apparatus including a spacer-integrated retaining clip according to the first embodiment of the present disclosure may be utilized in strengthening a structure or constructing a pavement.

Figure 11:
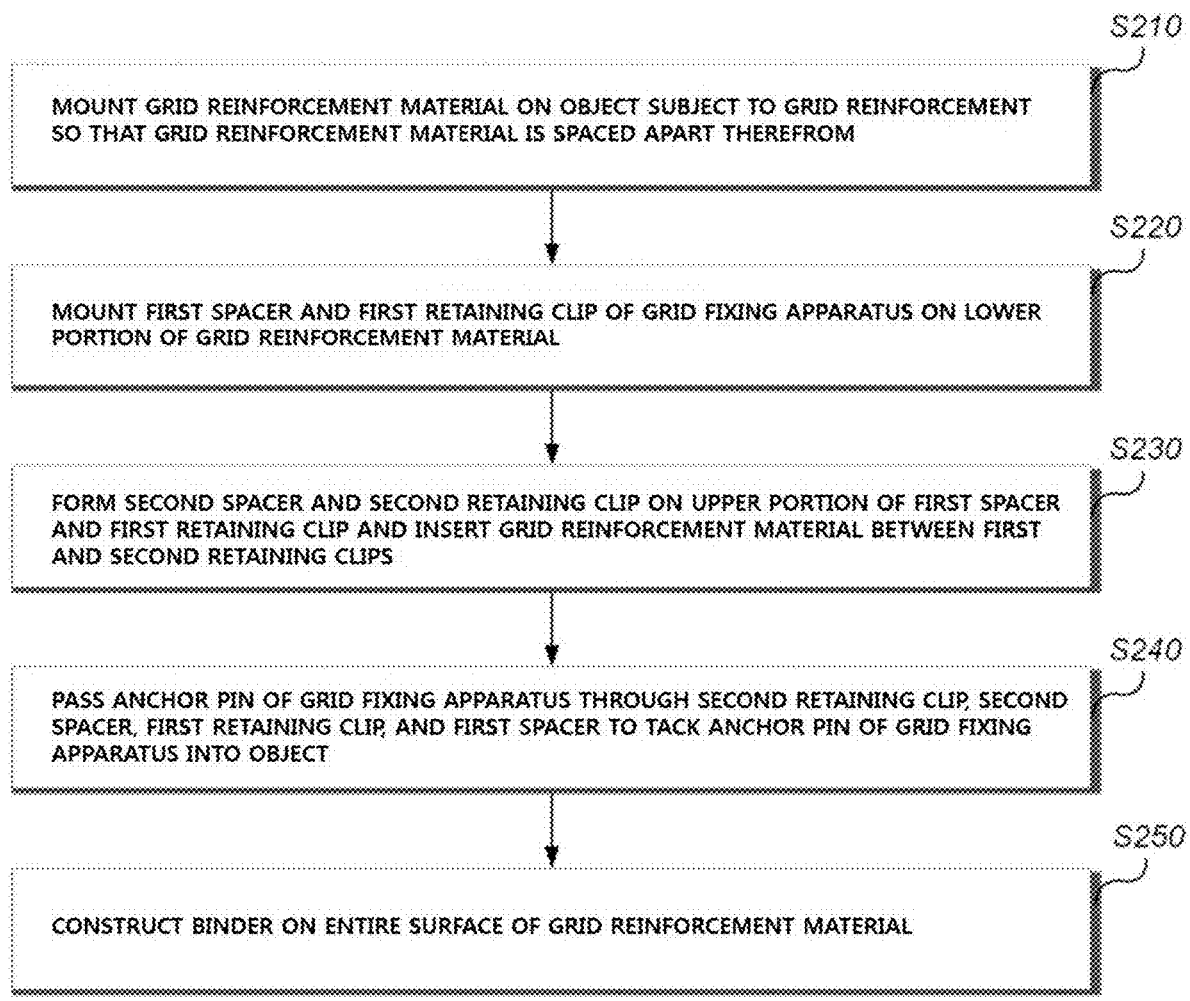
FIG. 11 is an operational flowchart of a grid fixing method using a grid fixing apparatus including a spacer-integrated retaining clip according to a second embodiment of the present disclosure.

Second Embodiment: Grid Fixing Method Using Grid Fixing Apparatus Including Spacer-Integrated Retaining Clip FIG. 11 is an operational flowchart of a grid fixing method using a grid fixing apparatus including a spacer-integrated retaining clip according to a second embodiment of the present disclosure, and FIGS. 12A to 12E are views for describing the grid fixing method using a grid fixing apparatus including a spacer-integrated retaining clip according to the second embodiment of the present disclosure in detail.

Figure 12A:
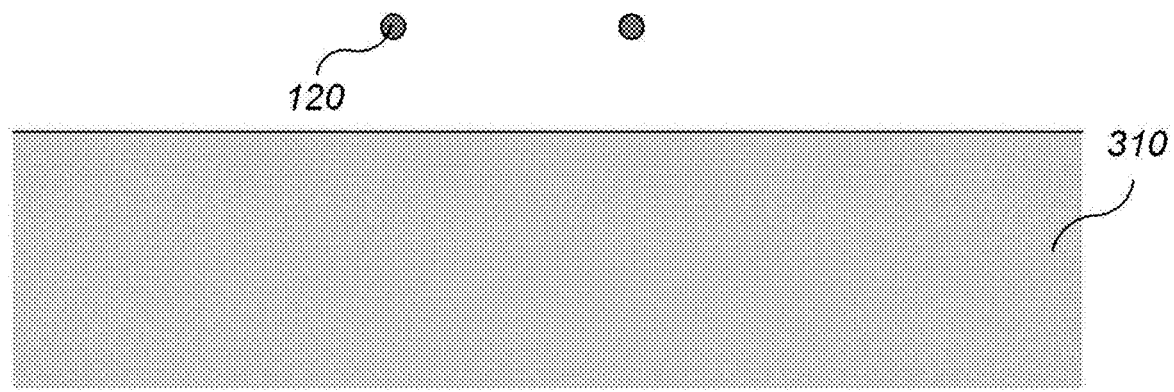
FIGS. 12A to 12E are views for describing the grid fixing method using a grid fixing apparatus including a spacer-integrated retaining clip according to the second embodiment of the present disclosure in detail.

Referring to FIG. 11 and FIGS. 12A to 12E, in the grid fixing method using a grid fixing apparatus including a spacer-integrated retaining clip according to the second embodiment of the present disclosure, which is a grid fixing method using a grid fixing apparatus for grid reinforcement of an object, first, as illustrated in FIG. 12A, the grid reinforcement material 120 is mounted on the object 310 subject to grid reinforcement so as to be spaced apart therefrom (S210).

Figure 12B:
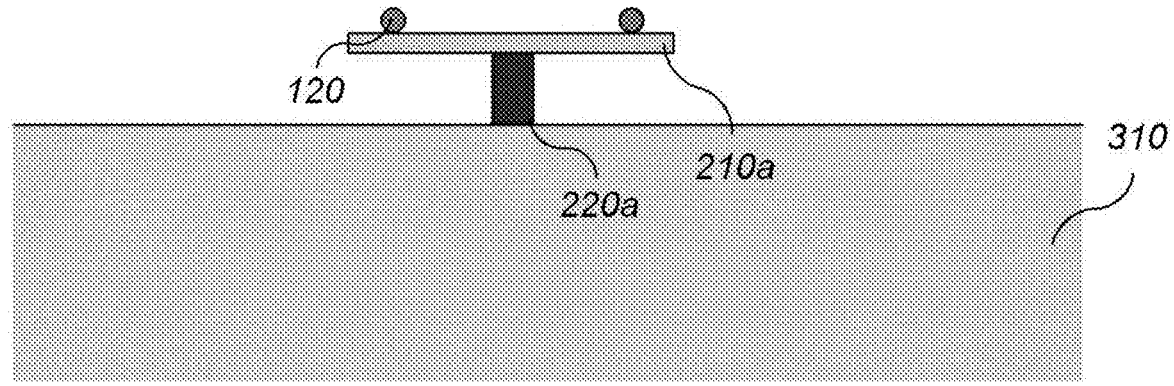

Next, as illustrated in FIG. 12B, the first spacer 220a and the first retaining clip 210a of the grid fixing apparatus 200b are mounted on a lower portion of the grid reinforcement material 120 (S220).

Specifically, as illustrated in FIG. 6C, the grid fixing apparatus 200b includes the first retaining clip 210a which has the first through-hole h1 formed in the central portion and comes in direct contact with the lattice-type grid reinforcement material 120 so that the grid reinforcement material 120 is fixed, the first spacer 220a which has the second through-hole h2 corresponding to the first through-hole h1 formed therein and which is integrally formed with a lower surface of the first retaining clip 210a so that the first retaining clip 210a maintains a predetermined distance from the object 310, the second retaining clip 210b which is formed to be stacked on the first retaining clip 210a, has the third through-hole h3 formed in the central portion, and comes in direct contact with the grid reinforcement material 120, the second spacer 220b which has a length corresponding to the diameter of the grid reinforcement material 120 and the fourth through-hole h4 corresponding to the third through-hole h3 formed therein, is formed to be stacked on the first spacer 220a, and is integrally formed with a lower surface of the second retaining clip 210b, and the anchor pin 230 which is tacked using the tacker or tacking device 500 and which passes through the third through-hole h3, the fourth through-hole h4, the first through-hole h1, and the second through-hole h2 as illustrated in FIG. 6C to be tacked into the object 310.

Figure 12C:
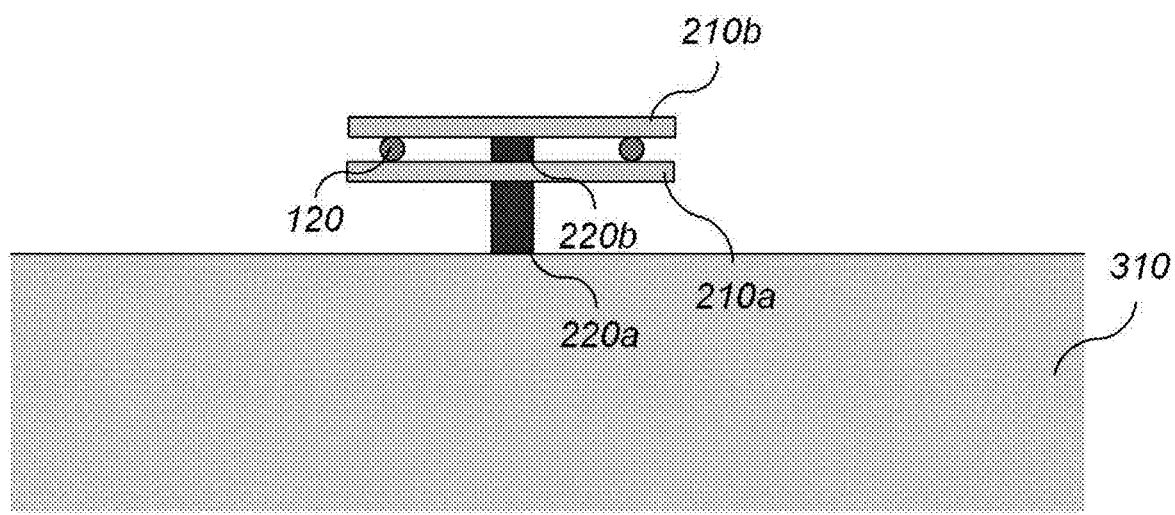

Next, as illustrated in FIG. 12C, the second spacer 220b and the second retaining clip 210b are formed on an upper portion of the first spacer 220a and the first retaining clip 210a, and the grid reinforcement material 120 is inserted and fixed between the first and second retaining clips 210a and 210b (S230).

Figure 12D:
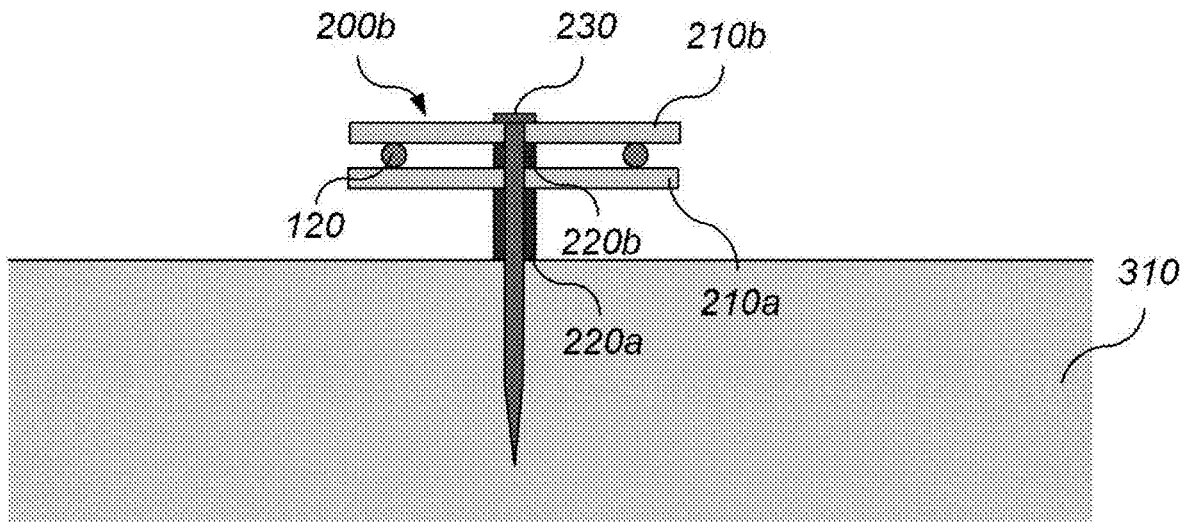

Next, as illustrated in FIG. 12D, the anchor pin 230 of the grid fixing apparatus is tacked into the object 310 by passing through the second retaining clip 210b, the second spacer 220b, the first retaining clip 210a, and the first spacer 220a (S240).

Figure 12E:
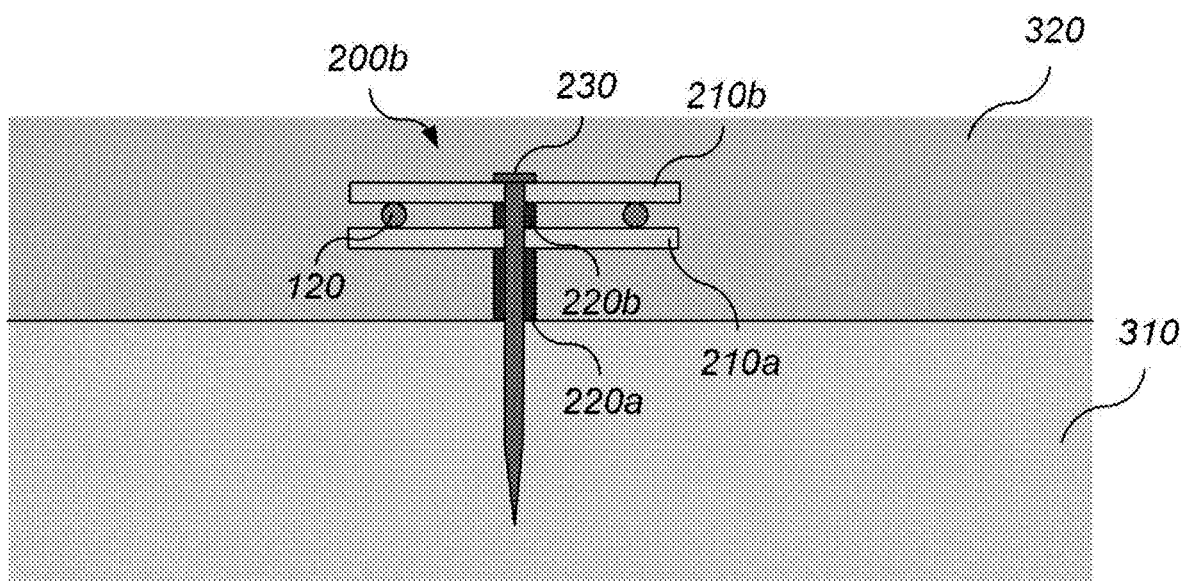

Next, as illustrated in FIG. 12E, a binder 320 is constructed on an entire surface of the grid reinforcement material 120 (S250).

Accordingly, since the grid reinforcement material 120 is fixed in the vertical and horizontal directions by the first and second retaining clips 210a and 210b in a state in which the grid reinforcement material 120 maintains a predetermined distance from the object 310 by the first spacer 220a, the grid reinforcement material 120 may be precisely constructed on the object 310.

According to the second embodiment of the present disclosure, in the method of constructing the grid reinforcement material 120 so that the grid reinforcement material 120 maintains a predetermined distance to be spaced apart from the object 310, the grid fixing apparatus 200b including the first and second spacers 220a and 220b is constructed to be tacked into the object 310, and then the binder 320 is constructed on the object 310 and the entire surface of the upper portion of the grid reinforcement material 120.

The grid fixing method using a grid fixing apparatus including a spacer-integrated retaining clip according to the second embodiment of the present disclosure may be utilized in strengthening a structure or constructing a pavement.

Figure 13:
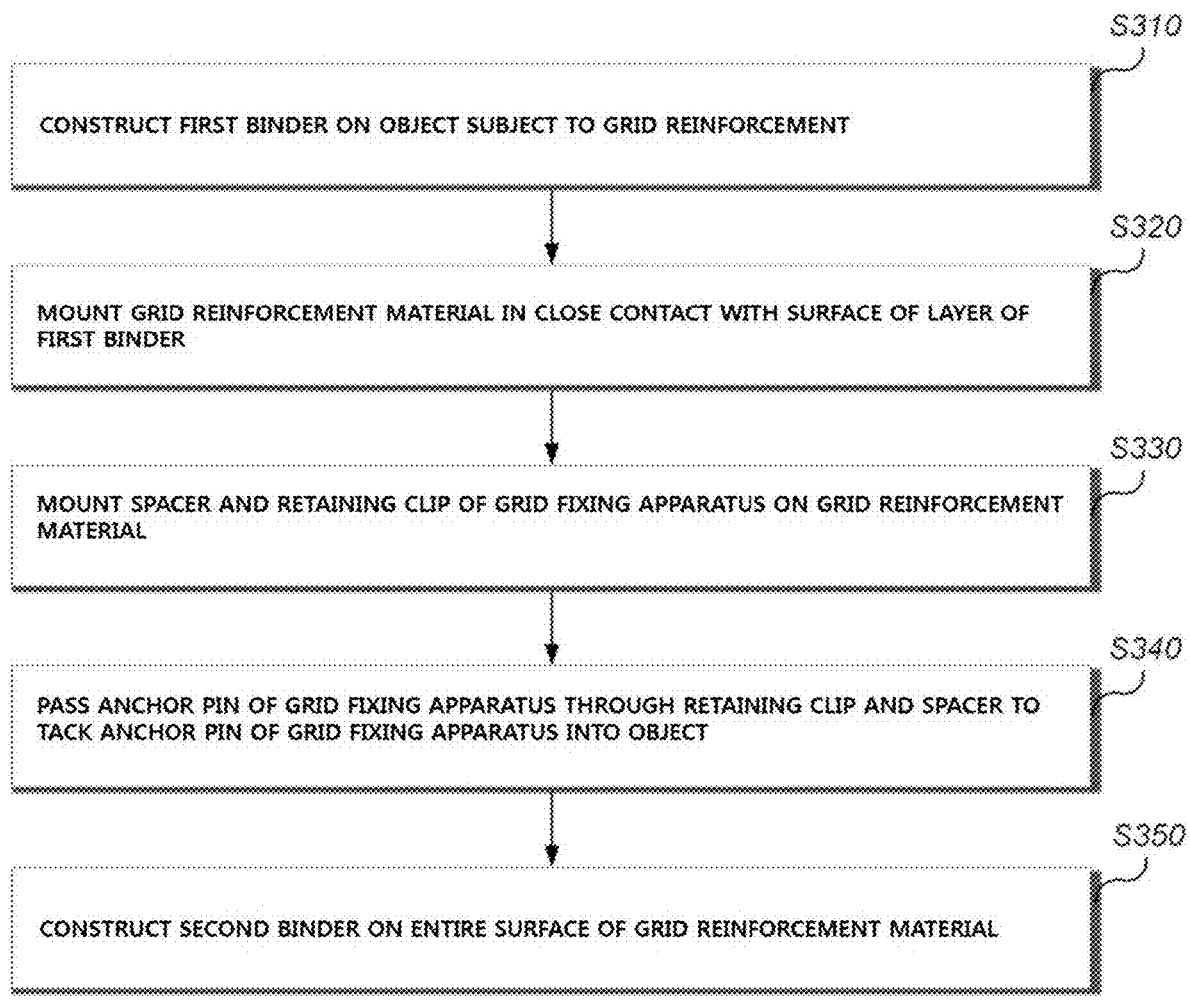
FIG. 13 is an operational flowchart of a grid fixing method using a grid fixing apparatus including a spacer-integrated retaining clip according to a third embodiment of the present disclosure.

Third Embodiment: Grid Fixing Method Using Grid Fixing Apparatus Including Spacer-Integrated Retaining Clip FIG. 13 is an operational flowchart of a grid fixing method using a grid fixing apparatus including a spacer-integrated retaining clip according to a third embodiment of the present disclosure, and FIGS. 14A to 14E are views for describing the grid fixing method using a grid fixing apparatus including a spacer-integrated retaining clip according to the third embodiment of the present disclosure in detail.

Figure 14A:
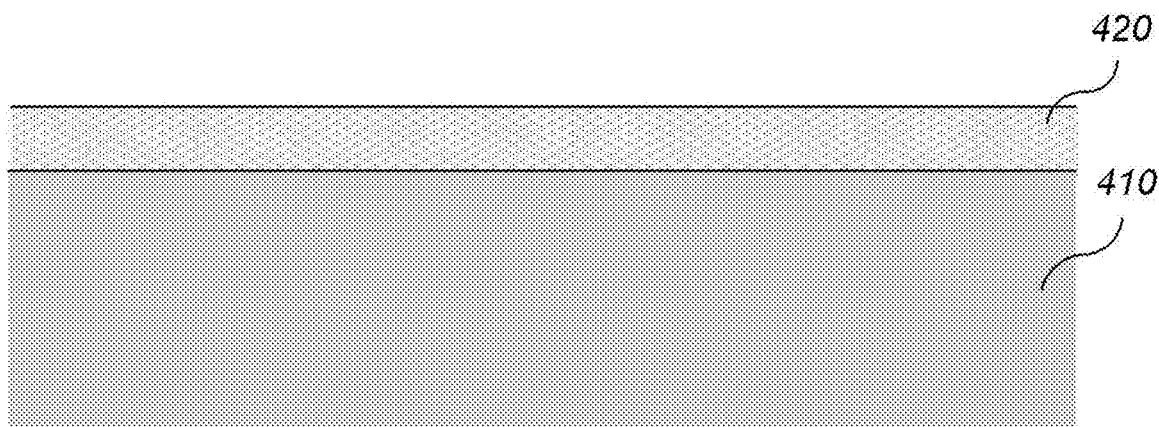
FIGS. 14A to 14E are views for describing the grid fixing method using a grid fixing apparatus including a spacer-integrated retaining clip according to the third embodiment of the present disclosure in detail.

Referring to FIG. 13 and FIGS. 14A to 14E, in the grid fixing method using a grid fixing apparatus including a spacer-integrated retaining clip according to the third embodiment of the present disclosure, which is a grid fixing method using a grid fixing apparatus for grid reinforcement of an object, first, as illustrated in FIG. 14A, a first binder 420 is constructed on an object 410 subject to grid reinforcement (S310). Here, as the first binder, an expanded polystyrene (EPS) insulation material may be used in the case of external insulation.

Figure 14B:
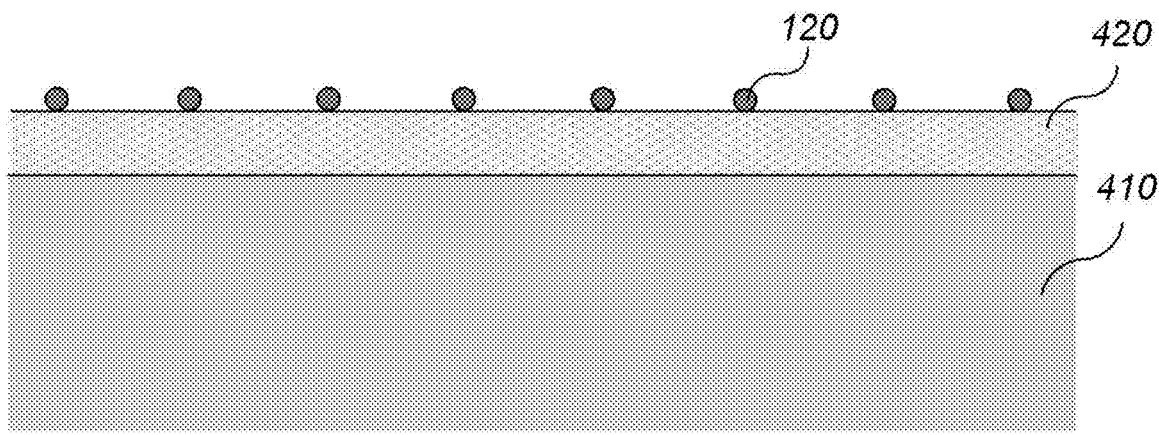

Next, as illustrated in FIG. 14B, the grid reinforcement material 120 is mounted in close contact with a surface of a layer of the first binder 420 (S320).

Figure 14C:
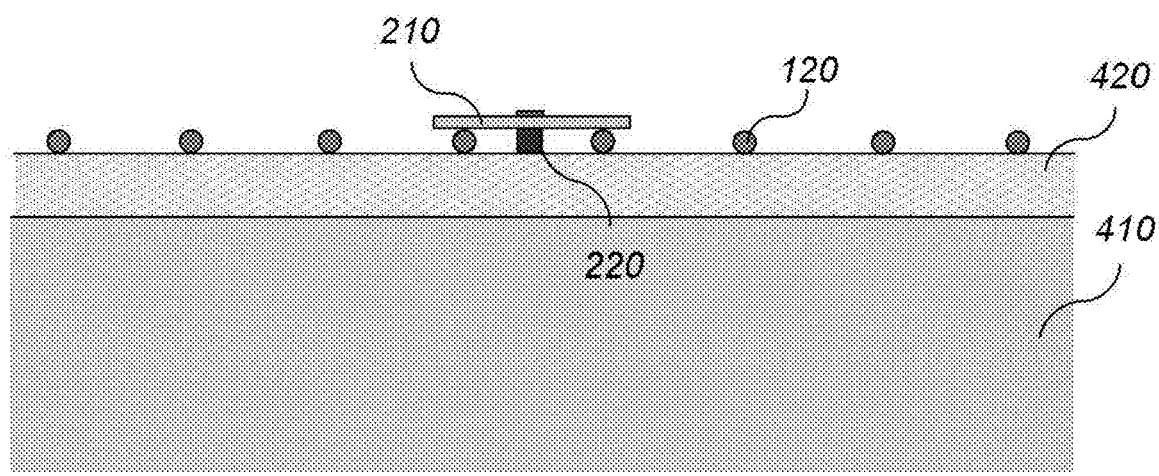

Next, as illustrated in FIG. 14C, the spacer 220 and the retaining clip 210 of the grid fixing apparatus 200 are mounted on the grid reinforcement material 120 (S330).

Figure 14D:
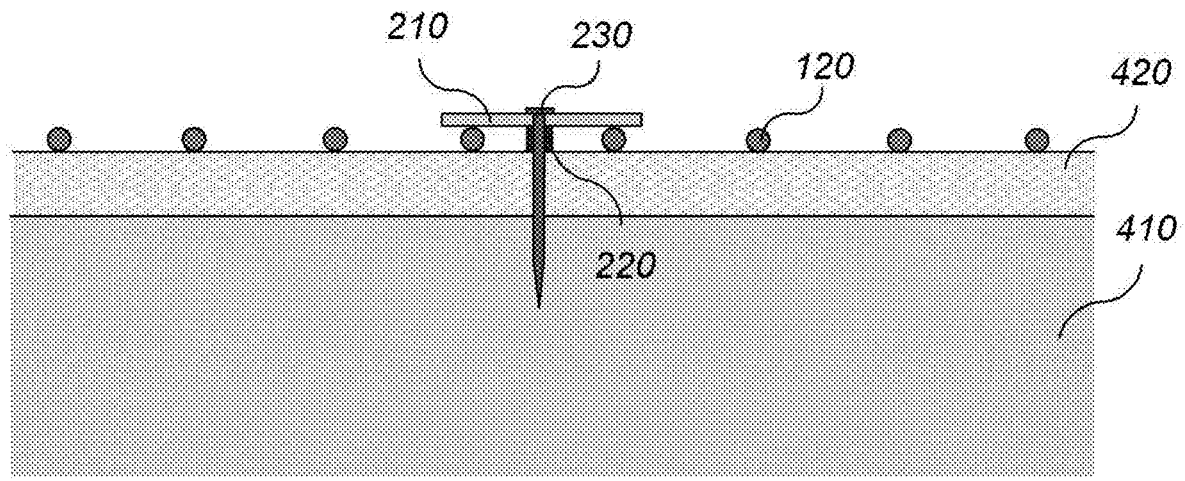

Next, as illustrated in FIG. 14D, the anchor pin 230 of the grid fixing apparatus 200 is tacked into the object 410 by passing through the retaining clip 210 and the spacer 220 (S340).

Figure 14E:
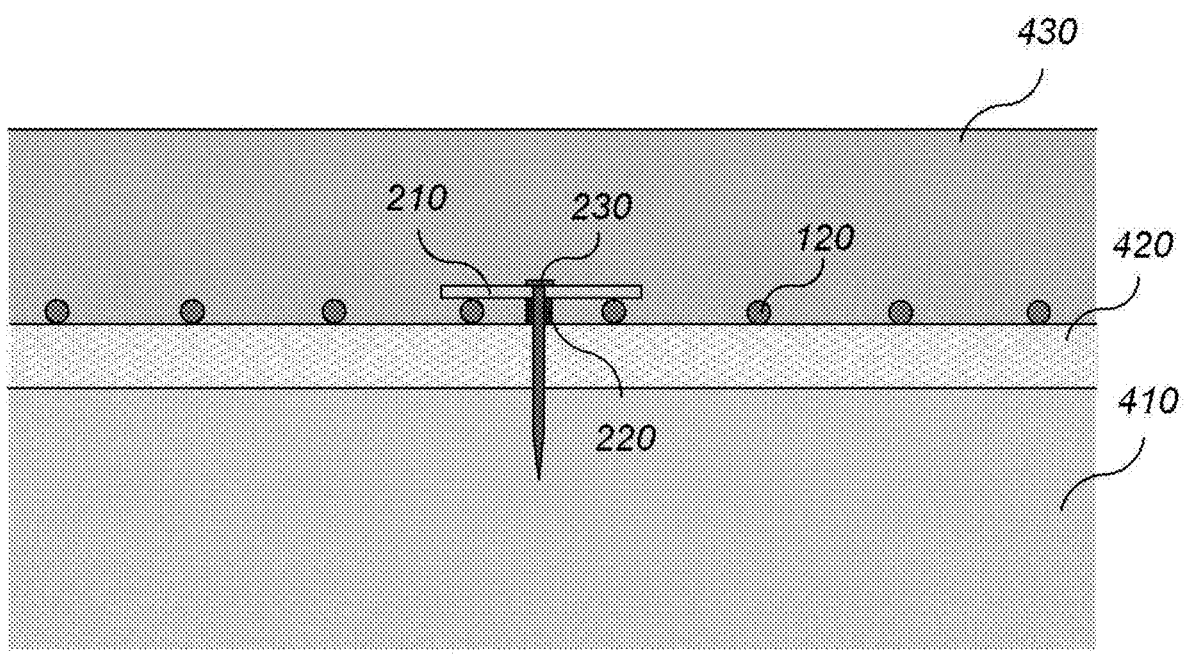

Next, as illustrated in FIG. 14E, a second binder 430 is constructed on the entire surface of the grid reinforcement material 120 (S350).

Accordingly, since the grid reinforcement material 120 is fixed in the vertical and horizontal directions by the retaining clip 210 in a state in which the grid reinforcement material 120 maintains a predetermined distance from the object 410 by the spacer 220, the grid reinforcement material 120 may be precisely constructed on the object 410.

According to the third embodiment of the present disclosure, the first binder (or EPS insulation material in the case of external insulation) is constructed on an outer side of the object 410, the grid reinforcement material 120 is tacked into and fixed to the object 410 using the grid fixing apparatus 200, and the second binder (or a finishing material, etc.) is constructed on an upper surface of the grid reinforcement material 120.

The grid fixing method using a grid fixing apparatus including a spacer-integrated retaining clip according to the third embodiment of the present disclosure may be utilized in strengthening a structure or constructing external insulation.

Consequently, the embodiments of the present disclosure may be applied to all grid reinforcement materials manufactured in a lattice shape, such as a metallic mesh, a geogrid, and a textile grid made of a high-strength fiber, and may be utilized in construction of a grid reinforcement material to which various binders such as concrete, mortar, a pavement material, and a finishing material are applied.

According to the present disclosure, a retaining clip and a spacer are integrally formed and a grid fixing apparatus is formed to be tacked into an object through an anchor pin to firmly fix a grid reinforcement material to a surface or an outer side of the object, and accordingly, the grid reinforcement material is fixed in vertical and horizontal directions, and the grid reinforcement material can be precisely constructed.

The present disclosure can be applied to all grid reinforcement materials manufactured in a lattice shape, such as a metallic mesh, a geogrid, and a textile grid made of a high-strength fiber, and can be utilized in construction of a grid reinforcement material to which various binders such as concrete, mortar, a pavement material, and a finishing material are applied.

The above-given description of the present disclosure is only illustrative, and those of ordinary skill in the art to which the present disclosure pertains should understand that the present disclosure may be modified into other specific forms without changing the technical idea or essential features of the present disclosure. Therefore, the embodiments described above should be understood as illustrative, rather than limiting, in all aspects. For example, each element described as having a single form may be implemented in a distributed manner, and likewise, elements described as being distributed may be implemented in a combined form.

The scope of the present disclosure is shown in the claims below rather than in the detailed description above, and all changes or modifications derived from the meaning and scope of the claims and their equivalents should be interpreted as falling within the scope of the present disclosure.

What is claimed is:

1. A grid fixing assembly for grid reinforcement of an object, the grid fixing assembly comprising a grid fixing apparatus and a grid reinforcement material comprising a lattice structure, wherein the grid fixing apparatus comprises:

at least one retaining clip which has a first through-hole formed in a central portion and is configured to be in direct contact with the lattice structure of the grid reinforcement material so that the grid reinforcement material is fixed;

at least one spacer which has a second through-hole corresponding to the first through-hole formed therein and which is integrally formed with a lower surface of the at least one retaining clip that is configured to face toward the object so that the at least one retaining clip is able to maintain a predetermined distance from the object; and an anchor pin which is tacked using a tacker or tacking device and passes through the first through-hole formed in the at least one retaining clip and the second through-hole formed in the at least one spacer to be tacked into the object, wherein the at least one retaining clip is configured to fix the grid reinforcement material in vertical and horizontal directions in a state in which the grid reinforcement material maintains a predetermined distance from the object by the at least one spacer so that the grid reinforcement material is precisely constructed on the object, wherein the grid reinforcement material is configured to be fixed to one side or both sides of an upper surface of the at least one retaining clip, and the at least one retaining clip is configured to be simply mounted or the grid reinforcement material is configured to be fixed to the at least one retaining clip using an adhesive, wherein the at least one retaining clip comprises a first retaining clip and a second retaining clip respectively configured to be stacked above an upper surface of the grid reinforcement material that faces away from the object and under a lower surface of the grid reinforcement material that faces toward the object, wherein the at least one spacer comprises a first spacer for maintaining a distance from the object and a second spacer configured to be stacked on the first spacer, wherein the second spacer has a length corresponding to a diameter of the grid reinforcement material.

2. The grid fixing assembly of claim 1, wherein the at least one retaining clip is made of a noncorrosive metal, plastic, or polypropylene and is formed in a cross shape, a linear shape, a quadrilateral shape, or a circular shape.

3. The grid fixing assembly of claim 1, wherein the anchor pin includes:
a tip portion sharply formed so that the anchor pin is tackable into the object;
a body portion which has one side connected to the tip portion and another side connected to a head portion; and
the head portion formed at the other side of the body portion to allow hitting to be performed using the tacker or tacking device.

4. A grid fixing method using a grid fixing apparatus including a spacer-integrated retaining clip, which is a grid fixing method using a grid fixing apparatus for grid reinforcement of an object, the grid fixing method comprising:
a) mounting a grid reinforcement material comprising a lattice structure in close contact with the object subject to grid reinforcement;
b) mounting a spacer and a retaining clip of a grid fixing apparatus on the grid reinforcement material; and
c) passing an anchor pin of the grid fixing apparatus through the retaining clip and the spacer to tack the anchor pin of the grid fixing apparatus into the object, wherein the object is concrete, an outer wall body, or a pavement base layer, and
the grid reinforcement material is fixed in vertical and horizontal directions by the retaining clip in a state in which the grid reinforcement material maintains a predetermined distance from the object by the spacer so that the grid reinforcement material is precisely constructed on the object, wherein the grid fixing apparatus comprises:
the retaining clip which has a first through-hole formed in a central portion and comes in direct contact with the lattice structure of the grid reinforcement material so that the grid reinforcement material is fixed;
the spacer which has a second through-hole corresponding to the first through-hole formed therein and which is integrally formed with a lower surface of the retaining clip so that the retaining clip maintains a predetermined distance from the object, and the spacer has a length corresponding to a diameter of the grid reinforcement material; and
the anchor pin which is tacked using a tacker or tacking device and passes through the first through-hole formed in the retaining clip and the second through-hole formed in the spacer to be tacked into the object.

5. The grid fixing method of claim 4, wherein the retaining clip is made of a noncorrosive metal, plastic, or polypropylene and is formed in a cross shape, a linear shape, a quadrilateral shape, or a circular shape.

6. The grid fixing method of claim 4, wherein the grid reinforcement material is fixed to one side or both sides of an upper surface of the retaining clip, and the retaining clip is simply mounted or the grid reinforcement material is fixed thereto using an adhesive.

7. The grid fixing method of claim 4, wherein the anchor pin includes:
a tip portion sharply formed so that the anchor pin is tacked into the object;
a body portion which has one side connected to the tip portion and and another side connected to a head portion; and
the head portion formed at the other side of the body portion to allow hitting to be performed using the tacker or tacking device.

8. A grid fixing method using a grid fixing apparatus including a spacer-integrated retaining clip, which is a grid fixing method using a grid fixing apparatus for grid reinforcement of an object, the grid fixing method comprising:
a) mounting a grid reinforcement material comprising a lattice structure on the object subject to grid reinforcement so that the grid reinforcement material is spaced apart therefrom;
b) mounting a first spacer and a first retaining clip of a grid fixing apparatus on a lower portion of the grid reinforcement material that faces toward the object;
c) forming a second spacer and a second retaining clip on an upper portion of the grid reinforcement material that is above the first spacer and the first retaining clip in a direction away from the object and inserting and fixing the grid reinforcement material between the first retaining clip and the second retaining clip;
d) passing an anchor pin of the grid fixing apparatus through the second retaining clip, the second spacer, the first retaining clip, and the first spacer to tack the anchor pin of the grid fixing apparatus into the object; and
e) constructing a binder on an entire surface of the grid reinforcement material,
wherein the grid reinforcement material is fixed in vertical and horizontal directions by the first retaining clip and the second retaining clip in a state in which the grid reinforcement material maintains a predetermined distance from the object by the first spacer so that the grid reinforcement material is precisely constructed on the object, wherein the first spacer is integrally formed with a lower surface of the first retaining clip, and the second spacer has a length corresponding to a diameter of the grid reinforcement material.

9. The grid fixing method of claim 8, wherein the grid fixing apparatus includes:

the first retaining clip which has a first through-hole formed in a central portion and comes in direct contact with the lattice structure of the grid reinforcement material so that the grid reinforcement material is fixed;

the first spacer which has a second through-hole corresponding to the first through-hole formed therein and which is integrally formed with the lower surface of the first retaining clip so that the first retaining clip maintains a predetermined distance from the object;

the second retaining clip which is formed to be stacked on the first retaining clip, has a third through-hole formed in a central portion, and comes in direct contact with the grid reinforcement material;

the second spacer which has the length corresponding to the diameter of the grid reinforcement material and a fourth through-hole corresponding to the third through-hole formed therein, is formed to be stacked on the first spacer, and is integrally formed with a lower surface of the second retaining clip; and the anchor pin which is tacked using a tacker or tacking device and which passes through the third through-hole, the fourth through-hole, the first through-hole, and the second through-hole to be tacked into the object.

10. The grid fixing method of claim 9, wherein the first retaining clip and the second retaining clip are made of a noncorrosive metal, plastic, or polypropylene and are formed in a cross shape, a linear shape, a quadrilateral shape, or a circular shape.

11. The grid fixing method of claim 9, wherein the grid reinforcement material is fixed to one side or both sides of an upper surface of the first retaining clip and the second retaining clip, and the first retaining clip and the second retaining clip are simply mounted or the grid reinforcement material is fixed thereto using an adhesive.

12. The grid fixing method of claim 9, wherein the anchor pin includes:

a tip portion sharply formed so that the anchor pin is tacked into the object;

a body portion which has one side connected to the tip portion and another side connected to a head portion; and the head portion formed at the other side of the body portion to allow hitting to be performed using the tacker or tacking device.

13. A grid fixing method using a grid fixing apparatus including a spacer-integrated retaining clip, which is a grid fixing method using a grid fixing apparatus for grid reinforcement of an object, the grid fixing method comprising:

a) constructing a first binder on an object subject to grid reinforcement;

b) mounting a grid reinforcement material comprising a lattice structure in close contact with a surface of a layer of the first binder;

c) mounting a spacer and a retaining clip of a grid fixing apparatus on the grid reinforcement material;

d) passing an anchor pin of the grid fixing apparatus through the retaining clip and the spacer to tack the anchor pin of the grid fixing apparatus into the object; and e) constructing a second binder on an entire surface of the grid reinforcement material, wherein the grid reinforcement material is fixed in vertical and horizontal directions by the retaining clip in a state in which the grid reinforcement material maintains a predetermined distance from the object by the spacer so that the grid reinforcement material is precisely constructed on the object, wherein the grid fixing apparatus comprises:

the retaining clip which has a first through-hole formed in a central portion and comes in direct contact with the lattice structure of the grid reinforcement material so that the grid reinforcement material is fixed;

the spacer which has a second through-hole corresponding to the first through-hole formed therein and which is integrally formed with a lower surface of the retaining clip so that the retaining clip maintains a predetermined distance from the object, and the spacer has a length corresponding to a diameter of the grid reinforcement material; and the anchor pin which is tacked using a tacker or tacking device and passes through the first through-hole formed in the retaining clip and the second through-hole formed in the spacer to be tacked into the object.

14. The grid fixing method of claim 13, wherein the retaining clip is made of a noncorrosive metal, plastic, or polypropylene and is formed in a cross shape, a linear shape, a quadrilateral shape, or a circular shape.

15. The grid fixing method of claim 13, wherein the grid reinforcement material is fixed to one side or both sides of an upper surface of the retaining clip, and the retaining clip is simply mounted or the grid reinforcement material is fixed thereto using an adhesive.

16. The grid fixing method of claim 13, wherein the anchor pin includes:

a tip portion sharply formed so that the anchor pin is tacked into the object;

a body portion which has one side connected to the tip portion and another side connected to a head portion; and the head portion formed at the other side of the body portion to allow hitting to be performed using the tacker or tacking device.

* * * * *